US007753462B2

(12) United States Patent
Yamanobe et al.

(10) Patent No.: US 7,753,462 B2
(45) Date of Patent: Jul. 13, 2010

(54) IMAGE FORMING APPARATUS

(75) Inventors: Jun Yamanobe, Kanagawa (JP); Toshiyuki Makuta, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 565 days.

(21) Appl. No.: 11/507,540

(22) Filed: Aug. 22, 2006

(65) Prior Publication Data

US 2007/0046719 A1 Mar. 1, 2007

(30) Foreign Application Priority Data

Aug. 23, 2005 (JP) ............................ 2005-241244

(51) Int. Cl.

| | |
|---|---|
| ***B41J 2/195*** | (2006.01) |
| ***B41J 2/015*** | (2006.01) |
| ***B41J 2/01*** | (2006.01) |
| ***C08J 7/04*** | (2006.01) |

(52) U.S. Cl. ............................ 347/7; 347/21; 347/102; 427/511

(58) Field of Classification Search .............. 106/31.13, 106/31.27, 31.6; 347/21, 45, 85, 95, 100, 347/101, 102; 427/511; 428/32.1
See application file for complete search history.

(56) References Cited

U.S. PATENT DOCUMENTS 6,582,047 B2 * 6/2003 Koitabashi et al. ............ 347/16
2003/0063172 A1 * 4/2003 Ohtsu et al. ................. 347/102
2004/0106700 A1 * 6/2004 Yamanouchi et al. ....... 523/160

FOREIGN PATENT DOCUMENTS

JP 2004009483 A 1/2004

* cited by examiner

*Primary Examiner*—Matthew Luu
*Assistant Examiner*—Kendrick X Liu
(74) *Attorney, Agent, or Firm*—Birch, Stewart, Kolasch & Birch, LLP

(57) ABSTRACT

The image forming apparatus comprises: an applying device that applies a first liquid containing a diffusion preventing agent for a coloring material, onto a recording medium; a droplet depositing device that deposits a second liquid containing the coloring material, onto the recording medium onto which the first liquid has been applied; a radiation irradiating device that radiates radiation onto the recording medium onto which the second liquid has been deposited; and a controlling device that controls a time from the second liquid being deposited to the second liquid being irradiated with the radiation, according to deposition data for the droplet depositing device.

9 Claims, 10 Drawing Sheets

HIGH RECORDING DENSITY

LOW RECORDING DENSITY

LOW DENSITY AREA

HIGH DENSITY AREA

IMAGE FORMING APPARATUS

BACKGROUND OF THE INVENTION

1. Field of the Invention

The present invention relates to an image forming apparatus, and in particular relates to art for controlling a dot diameter on a recording medium.

2. Description of the Related Art

Inkjet recording apparatuses (inkjet printers) according to which an image is formed by dots on a recording medium formed by liquid ejected from a plurality of nozzles formed in heads (liquid ejection heads) while the heads and the recording medium are moved relatively to one another, have been known.

With such an inkjet recording apparatus, by making the recording density (the number of dots that can be deposited per unit area) be variable, there can be provided a system according to which both high quality and high speed can be achieved. For example, when high quality is considered important, the recording density is made high, whereas when high speed is considered important, the recording density is made low. However, in the case where the recording density is made low, if dots of the same size as that when the recording density is high are deposited, then there is little overlap of dots, and in some cases, voids may arise between dots. A method in which the dot diameter (diameter) $\phi$ is changed by changing the droplet volume V of the droplets ejected from the nozzles has thus been known. It is well known that the relationship between $\phi$ and V is in general "$\phi \propto V^{1/3}$". However, with a system in which the droplet volume V is made to be variable in this way, it is necessary to eject droplets of different droplet volume V depending on the recording density, and hence a plurality of different waveforms for the piezoelectric elements in the heads are required to be prepared.

A method in which the dot diameter is controlled with a single waveform (i.e. a single droplet volume V) has thus been proposed in, for example, Japanese Patent Application Publication No. 2004-9483. According to Japanese Patent Application Publication No. 2004-9483, in a system in which an ultraviolet radiation (UV)-curable ink is used, the dot diameter is controlled depending on the way of applying UV (the time interval from droplet deposition to irradiation, the duration of the irradiation, and the intensity of the irradiation) being changed in accordance with the recording medium or the recording mode.

However, in the case of a system in which an ultraviolet radiation-curable ink is directly deposited onto a recording medium as in Japanese Patent Application Publication No. 2004-9483, each droplet spreads out up to a certain time T0 (in general, a few μsec to a few tens of μsec) after landing, and then reaches equilibrium. That is, if the time interval from the deposition of a droplet to the UV irradiation is less than T0, then the dot diameter can be controlled through the way of applying the UV; however, if the time is beyond the time interval T0, then it is difficult to control the dot diameter since the droplet has reached equilibrium. Here, defining the "spreading ratio" as the ratio of the diameter of a dot that has landed on the recording medium to the diameter assuming the droplet to be spherical, the spreading ratio of the dot which has been once reached equilibrium as above is approximately 2. Hence, with the art disclosed in Japanese Patent Application Publication No. 2004-9483, the control can be carried out only with respect to a dot having a spreading ratio of up to approximately 2, and it is difficult to control the dot diameter over a wide range.

SUMMARY OF THE INVENTION

In view of the above circumstances, it is an object of the present invention to provide an image forming apparatus according to which the dot diameter can be controlled over extensively.

In order to attain the aforementioned object, the present invention is directed to an image forming apparatus comprising: an applying device that applies a first liquid containing a diffusion preventing agent for a coloring material, onto a recording medium; a droplet depositing device that deposits a second liquid containing the coloring material, onto the recording medium onto which the first liquid has been applied; a radiation irradiating device that radiates radiation onto the recording medium onto which the second liquid has been deposited; and a controlling device that controls a time from the second liquid being deposited to the second liquid being irradiated with the radiation, according to deposition data for the droplet depositing device.

According to this aspect of the present invention, the second liquid containing the coloring material is deposited after the first liquid containing the diffusion preventing agent for the coloring material has been applied onto the recording medium. Hence, a dot formed from the second liquid on the recording medium does not attain equilibrium, which is different from the related art; and the dot diameter continues to increase until the irradiation of radiation is performed. Accordingly, the dot diameter can be controlled to a desired value over a wider range. Moreover, the time from the second liquid being deposited to the irradiation of radiation being performed is controlled according to deposition data for the droplet depositing device. Accordingly, an optimum image can be formed.

Preferably, the controlling device controls the time in such a manner that the relatively lower a recording density by the droplet depositing device becomes, the longer the time is.

According to this aspect of the present invention, voids can be prevented from occurring in the case where the recording density is low. As a result, an image that is optimum in accordance with the recording density can be formed.

Preferably, the controlling device controls the time in such a manner that the relatively higher a deposition amount by the droplet depositing device becomes, the longer the time is.

According to this aspect of the present invention, the dot visibility can be reduced and hence graininess (a feeling of rough surface) can be suppressed in the case where the deposition amount is low, whereas the decrease in the optical density can be prevented in the case where the deposition amount is high. As a result, an image that is optimum in accordance with the deposition amount can be formed Preferably, the diffusion preventing agent contains at least one selected from the group including polymers having an amino group, polymers having an onium group, polymers having a nitrogen-containing hetero ring, and metal compounds.

According to this aspect of the present invention, the diffusion prevention effect is particularly good.

Preferably, the first liquid contains a high-boiling organic solvent and a radiation curing initiator; and the second liquid contains a radiation-curable polymerizable compound.

According to this aspect of the present invention, there is a good effect of avoiding deposition interference (landing interference).

Preferably, the high-boiling organic solvent satisfies the following conditions (i) and (ii): (i) viscosity of the high-boiling organic solvent is not more than 100 mPa·s at 25° C., or the viscosity of the high-boiling organic solvent is not more than 30 mPa·s at 60° C.; and (ii) a boiling point of the high-boiling organic solvent is higher than 100° C.

According to this aspect of the present invention, application of the liquid onto the recording medium is good because of the viscosity being as above, and moreover evaporation of the liquid from the recording medium can be reduced because of the boiling point being as above.

Preferably, the first liquid further contains a radiation-curable polymerizable compound and a radiation curing initiator; and the second liquid further contains a radiation-curable polymerizable compound.

According to this aspect of the present invention, curing by the radiation is good.

According to the present invention, the second liquid containing the coloring material is deposited after the first liquid containing the diffusion preventing agent for the coloring material has been applied onto the recording medium. Hence a dot formed from the second liquid on the recording medium does not attain equilibrium, and the dot diameter continues to increase until the irradiation of radiation is performed. Accordingly, the dot diameter can be controlled to a desired value widely. Moreover, the time from the second liquid being deposited to the irradiation of radiation being performed is controlled on the basis of deposition-data for the droplet depositing device. Accordingly, an optimum image can be formed.

BRIEF DESCRIPTION OF THE DRAWINGS

The nature of this invention, as well as other objects and benefits thereof, will be explained in the following with reference to the accompanying drawings, wherein.

DESCRIPTION OF THE PREFERRED EMBODIMENTS

The inventors of the present invention discovered that if, before a droplet of a coloring material-containing ink (second liquid, hereinafter referred to merely as the "ink") is deposited onto a recording medium, a substantially transparent treatment liquid (first liquid) containing a diffusion preventing agent for the coloring material is applied onto the recording medium, then the ink droplet that has landed on the recording medium can be made to continue spreading out while maintaining a dot shape. Moreover, by making one of the ink and the treatment liquid contain an ultraviolet radiation curing initiator (initiator), and making the other contain an ultraviolet radiation-curable polymerizable compound (monomer), and by changing the time T from an ink droplet being deposited to the ink droplet being irradiated with UV (ultraviolet radiation), the dot diameter (dot size) can be controlled over a wide range. Following is a description of fundamental aspects of the present invention, followed by a description of the specific apparatus configuration and so on relating to the present invention.

Figure 1:
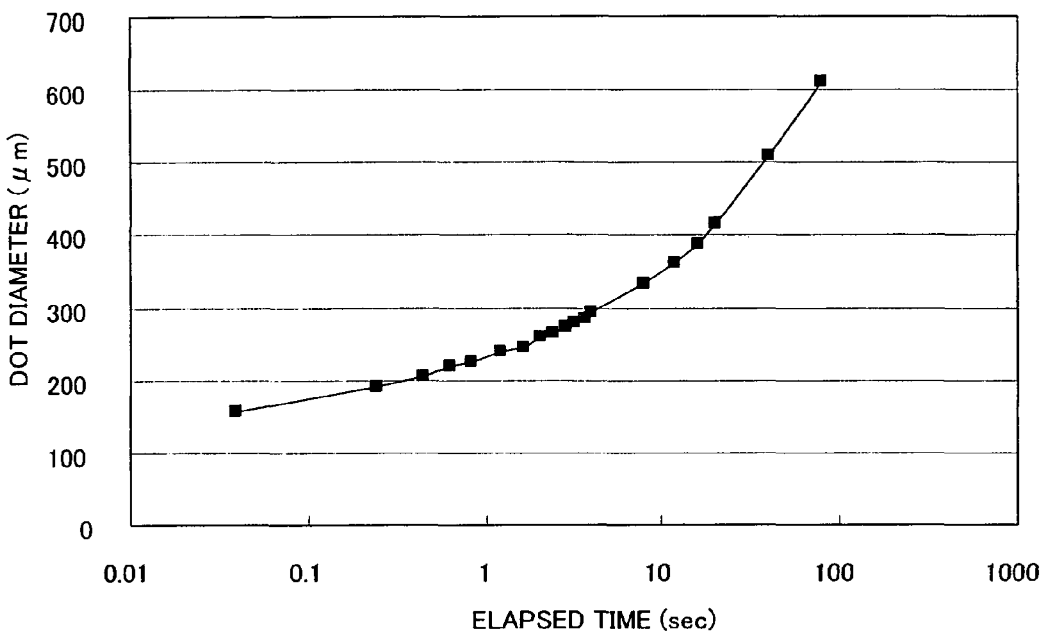
FIG. 1 is a graph showing the change over time in the dot diameter when an ink droplet is deposited on a treatment liquid.

FIG. 1 is a graph showing the change over time in the ink droplet diameter when a droplet of an ink having a pigment and a monomer dispersed therein is deposited over a treatment liquid which has been applied onto a recording medium. As can be seen from FIG. 1, the ink droplet does not attain an equilibrium state after landing, but rather continues to spread out over a long time. By irradiating the ink droplet with UV at a time when the ink droplet has reached a desired size, a desired dot can thus be formed.

Figure 2A:
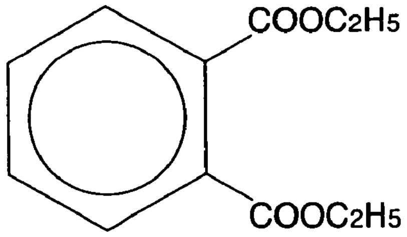
FIGS. 2A and 2B show substances contained in the treatment liquid used in the case of FIG. 1.
Figure 2B:
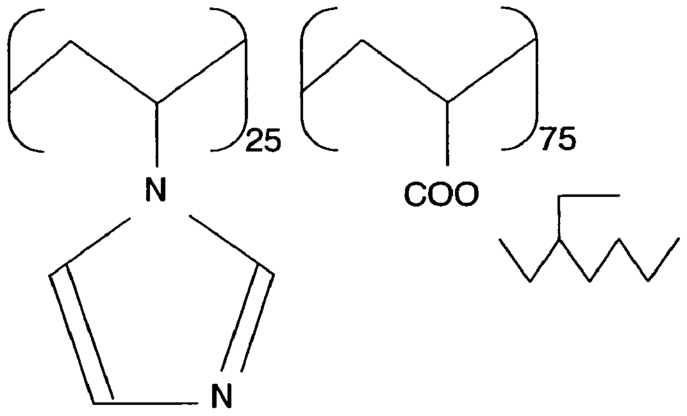

Note that the treatment liquid used for the graph of FIG. 1 was a mixture of the two compounds shown in FIGS. 2A and 2B, but there is no limitation thereto when the present invention is implemented.

Figure 3A:
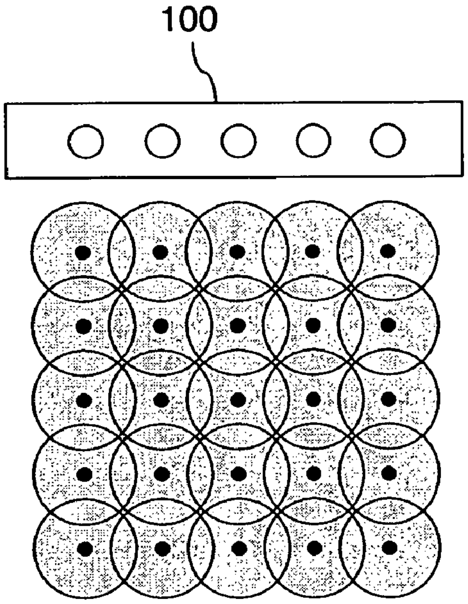
FIGS. 3A and 3B are schematic drawings of the dot arrangement when a solid image is formed, FIG. 3A showing the case that the recording density is high, and FIG. 3B showing the case that the recording density is low.
Figure 3B:
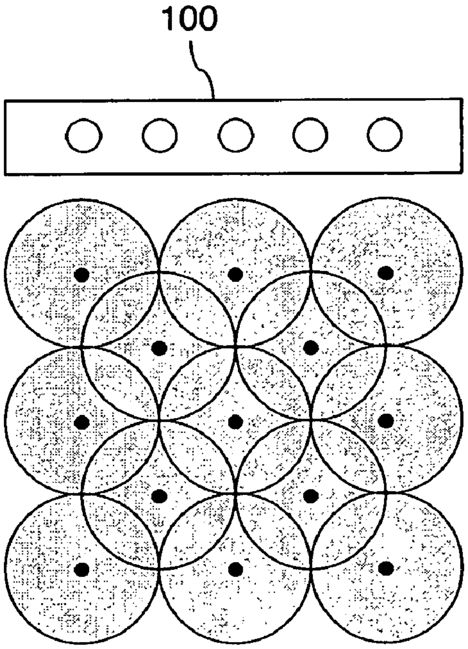

Next, the relationship between recording density (droplet deposition density) and dot diameter is described below with reference to FIGS. 3A and 3B. FIGS. 3A and 3B are schematic drawings of the dot arrangement when a solid image is formed, FIG. 3A showing the case where the recording density is high, and FIG. 3B showing the case where the recording density is low. The top row in each of FIGS. 3A and 3B shows schematically an ejection head 100 containing nozzles (shown as circles) from which liquid droplets are ejected to deposit the dots; likewise in FIGS. 4A and 4B, described later.

In the case where high quality (high resolution) printing is required, it is desirable to make the recording density high; however, in order to make the printing fast, reduce the ink deposition amount (reduce the cost), and so on, it may alternatively be required to make the recording density low (i.e. deposit the dots in a thinned out fashion). When the recording density is made low, if the dot diameter is made to be the same as that when the recording density is high, then there can be an increase in voids between dots. It is thus necessary to make the dot diameter greater when the recording density is low than that when the recording density is high, as shown in FIGS. 3A and 3B. Accordingly, in an embodiment of the present invention, when the recording density is low, the time T from depositing an ink droplet to irradiating the ink droplet with UV is lengthened, whereby the dot diameter is increased.

Figure 4A:
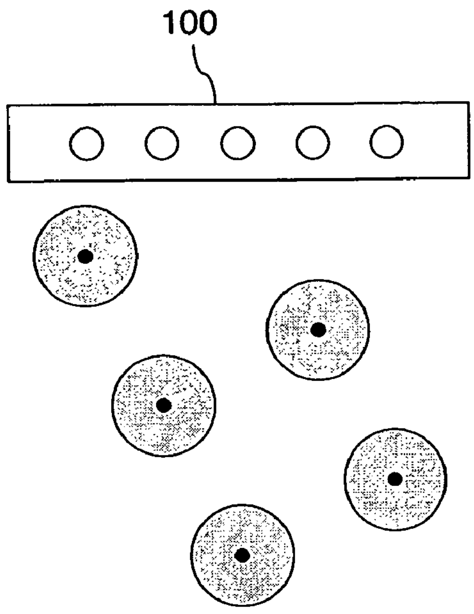
FIGS. 4A and 4B are schematic drawings of the dot arrangement when a solid image is formed, FIG. 4A showing the case that the ink deposition amount is low, and FIG. 4B showing the case that the ink deposition amount is high.
Figure 4B:
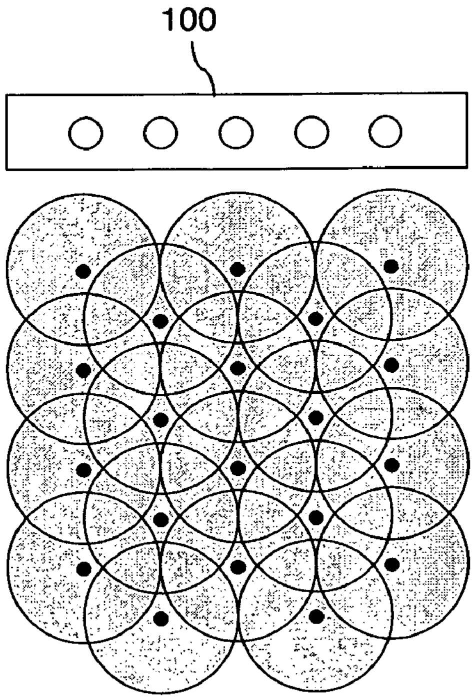

Next, the relationship between an ink deposition amount and a dot diameter is described below with reference to FIGS. 4A and 4B. FIGS. 4A and 4B are schematic drawings, FIG. 4A showing the case where the ink deposition amount is low (the optical density of the recorded image is low), and FIG. 4B showing the case where the ink deposition amount is high (the optical density of the recorded image is high).

In an area where the ink deposition amount is low, gaps can arise between dots. It is preferable to reduce the visibility of the dots and suppress graininess of the image in such an area by making the dot diameter low. On the other hand, in an area where the ink deposition amount is high, there is a possibility that if gaps (voids) arise between dots, then the overall optical density drops. In such an area, it is thus preferable to make the dot diameter large, so as to increase overlap between dots. It is thus necessary to make the dot diameter greater in high optical density areas than that in low optical density areas, as shown in FIGS. 4A and 4B. Accordingly, in embodiments of the present invention, when the ink deposition amount is high, the time T from depositing an ink droplet to irradiating the ink droplet with UV is lengthened, whereby the dot diameter is increased.

Next, the specific apparatus configuration, and the like, according to embodiments of the present invention are described below.

Figure 5:
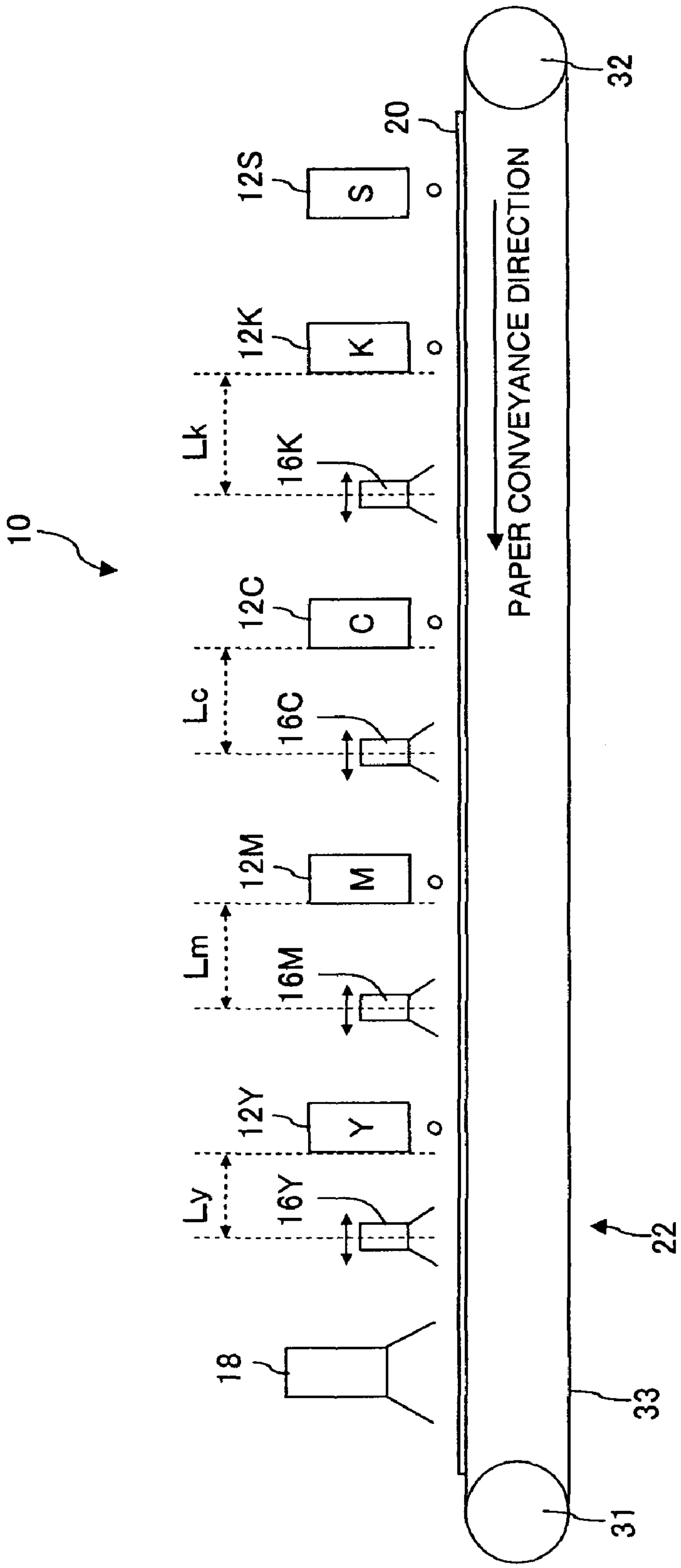
FIG. 5 is a schematic drawing of an inkjet recording apparatus.

FIG. 5 is a schematic drawing of an inkjet recording apparatus, which is an embodiment of an image forming apparatus according to an embodiment of the present invention. The inkjet recording apparatus 10 shown in FIG. 5 comprises: an ejection head (treatment liquid ejection head) 12S that ejects the treatment liquid (first liquid); a plurality of ink ejection heads 12K, 12C, 12M, and 12Y that eject different colored inks (second liquids); preliminary curing light sources 16K, 16C, 16M, and 16Y provided in correspondence with the ink ejection heads 12K, 12C, 12M, and 12Y; a main curing light source 18; and a suction belt conveyance unit 22 that is disposed facing nozzle surfaces (ink ejection surfaces) of the ejection heads (12S, 12K, 12C, 12M, 12Y) and conveys recording paper 20 in a paper conveyance direction (sub-scanning direction) while maintaining the flatness of the recording paper 20.

The suction belt conveyance unit 22 has a structure in which an endless belt 33 is set around rollers 31 and 32, and is configured such that at least a portion thereof facing the nozzle surfaces (ink ejection surfaces) of the ejection heads (12S, 12K, 12C, 12M, 12Y) is flat.

The belt 33 has a width that is greater than the width of the recording paper 20, and a large number of suction holes (not shown) are formed in the belt surface. A suction chamber (not shown) is provided on the interior side of the belt 33, which is set around the rollers 31 and 32. A negative pressure is generated by sucking out from the suction chamber using a fan (not shown), whereby the recording paper 20 is held on the belt 33 by suction.

Power from a motor (not shown) is transmitted to at least one of the rollers 31 and 32 around which the belt 33 is set, whereby the belt 33 is driven in a counterclockwise direction in FIG. 5, so that the recording paper 20 held on the belt 33 is conveyed from the right to the left in FIG. 5 (i.e. in the paper conveyance direction).

Each of the ejection heads 12S, 12K, 12C, 12M, and 12Y is a full line type head that has a length corresponding to the maximum paper width of the recording paper 20 that may be used in the inkjet recording apparatus 10, and has a plurality of nozzles for droplet ejection arranged in the nozzle surface over a length exceeding one side of the maximum size (i.e. the whole width of the area over which an image may be formed). Each of the ejection heads is installed so as to extend in a direction (the main scanning direction) substantially orthogonal to the paper conveyance direction (sub-scanning direction).

The treatment liquid ejection head 12S is disposed on the upstream side in the paper conveyance direction (the right side in FIG. 5), and the ink ejection heads 12K, 12C, 12M, and 12Y are arranged downstream thereof (after the treatment liquid ejection head 12S) in the color order black (K), cyan (C), magenta (M), and yellow (Y).

Each of the preliminary curing light sources 16K, 16C, 16M, and 16Y is disposed on the downstream side in the paper conveyance direction of the corresponding one of the ink ejection heads 12K, 12C, 12M, and 12Y (i.e., the preliminary curing light sources 16K, 16C, 16M, and 16Y are disposed after the ink ejection heads 12K, 12C, 12M, and 12Y, respectively as shown in FIG. 5). Each of the preliminary curing light sources 16K, 16C, 16M, and 16Y has a length corresponding to the maximum paper width of the recording paper 20, and is configured so as to extend in the main scanning direction. Each of the preliminary curing light sources 16K, 16C, 16M, and 16Y includes a light emitting element that radiates UV (ultraviolet radiation) of an energy sufficient to put dots on the recording paper 20 that have been deposited by the corresponding one of the ink ejection heads 12K, 12C, 12M, and 12Y disposed before that preliminary curing light source in the paper conveyance direction into a half-cured state (specifically, an energy sufficient to suppress spreading out of the dots). For example, a UV LED element, an LD element, or the like may be used.

Each of the preliminary curing light sources 16K, 16C, 16M, and 16Y is configured so as to be movable in the paper conveyance direction (i.e. the horizontal direction in FIG. 5), whereby a distance L (Lk, Lc, Lm, or Ly) to a preliminary curing light source from the corresponding one of the ink ejection heads 12K, 12C, 12M, and 12Y disposed upstream of the preliminary curing light source (before the preliminary curing light source) in the paper conveyance direction can be changed. As a result, the time T from depositing a droplet onto the recording paper 20 to irradiating the droplet with UV can be changed in accordance with the recording density or the deposition amount, whereby the dot diameter can be made to have a desired value.

The main curing light source 18 is disposed furthest downstream in the paper conveyance direction (furthest to the left in FIG. 5), has a length corresponding to the maximum paper width of the recording paper 20, and is installed so as to extend in the main scanning direction. The main curing light source 18 includes a light emitting element that radiates UV (ultraviolet radiation) of an energy sufficient to completely cure (carry out main curing on) the dots on the recording paper 20. For example, a mercury lamp, a metal halide lamp, or the like can be used.

According to the above configuration, as the recording paper 20 is conveyed by the suction belt conveyance unit 22, the treatment liquid is first ejected onto the recording paper 20 by the treatment liquid ejection head 12S. Ink droplets of the various colors are then ejected by the ink ejection heads 12K, 12C, 12M, and 12Y, whereby dots corresponding to the ink droplets of the various colors are formed on the recording paper 20. At this time, the dot diameter of each dot continues to increase until the dot is irradiated with UV by the preliminary curing light source 16K, 16C, 16M, or 16Y disposed downstream in the paper conveyance direction. In the present embodiment, the distance L (Lk, Lc, Lm, or Ly) from each ink ejection head 12K, 12C, 12M, or 12Y to the corresponding preliminary curing light source 16K, 16C, 16M, or 16Y, in other words, the time T from an ink droplet of each color being deposited to the ink droplet being irradiated with UV, is changed in accordance with the recording density or the deposition amount, whereby a desired dot diameter can be realized. UV irradiation by the main curing light source 18 is then finally carried out, whereby the dots on the recording paper 20 are put into a completely cured state, so that a desired color image is formed on the recording paper 20.

In the present embodiment, because a preliminary curing light source 16K, 16C, 16M, or 16Y is provided for each color, the time T up to a dot being irradiated with UV can be changed individually for each color dot, whereby the dot diameter can be individually controlled for each color.

A mode in which the preliminary curing light sources 16K, 16C, 16M, and 16Y are moved in accordance with the recording density or the deposition amount is given above as an example; however, instead of the preliminary curing light sources 16K, 16C, 16M, and 16Y, the ink ejection heads 12K, 12C, 12M, and 12Y may be moved or the speed of conveyance of the recording paper 20 by the suction belt conveyance unit 22 may be changed instead. Moreover, a configuration may also be adopted in which a plurality of preliminary curing light sources are provided for each of the ink ejection heads 12K, 12C, 12M, and 12Y, and a desired one of the plurality of preliminary curing light sources is selected and used.

Although the configuration with the KCMY four standard colors is described in the present embodiment, combinations of the ink colors and the number of colors are not limited to those. Light inks or dark inks can be added as required. For example, a configuration is possible in which ink ejection heads for ejecting light-colored inks such as light cyan and light magenta are added.

Next, the structure of the ejection heads 12S, 12K, 12C, 12M, and 12Y is described below. The same structure is common to each of the ejection heads 12S, 12K, 12C, 12M, and 12Y, and hence in the following reference numeral 50 is used to represent each of these ejection heads.

Figure 6A:
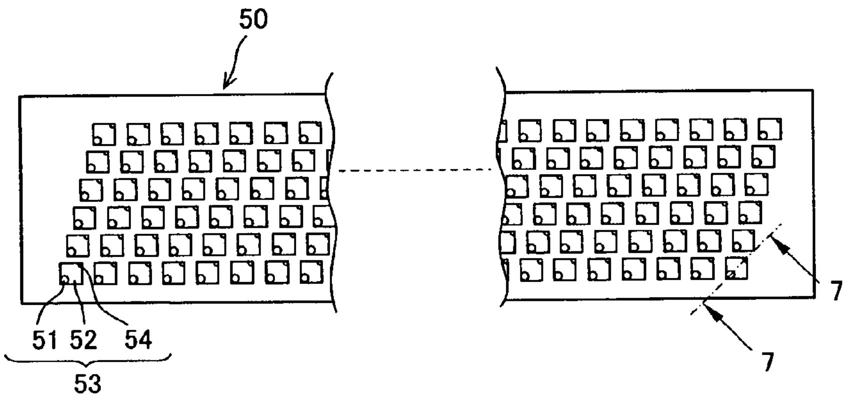
FIGS. 6A and 6B are planar perspective views of an ejection head, FIG. 6A showing a general view, and FIG. 6B showing an enlarged view of part of the ejection head.
Figure 6B:
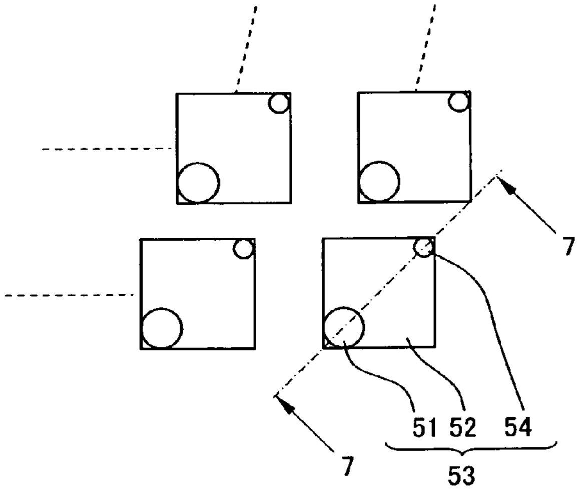

FIGS. 6A and 6B are planar perspective views showing an example of the structure of the ejection head 50, FIG. 6A showing a general view, and FIG. 6B showing an enlarged view of part of the ejection head. As shown in FIGS. 6A and 6B, in the present example, the ejection head 50 has a structure in which a plurality of pressure chamber units 53 each configured comprising a pressure chamber 52 having a substantially square shape in plan view, and a nozzle 51 and a supply port 54 disposed in diagonally opposite corners of the pressure chamber 52 are disposed in a (2-dimensional) staggered matrix shape. As a result, the nozzle pitch of a projected nozzle row obtained by projecting the nozzles so that the nozzles are lined up along the longitudinal direction of the ejection head 50 (the direction orthogonal to the paper conveyance direction) (i.e. the effective nozzle pitch) is made to be of higher density, whereby the pitch of the dots printed on the recording paper 20 is made to be of higher density.

Figure 7:
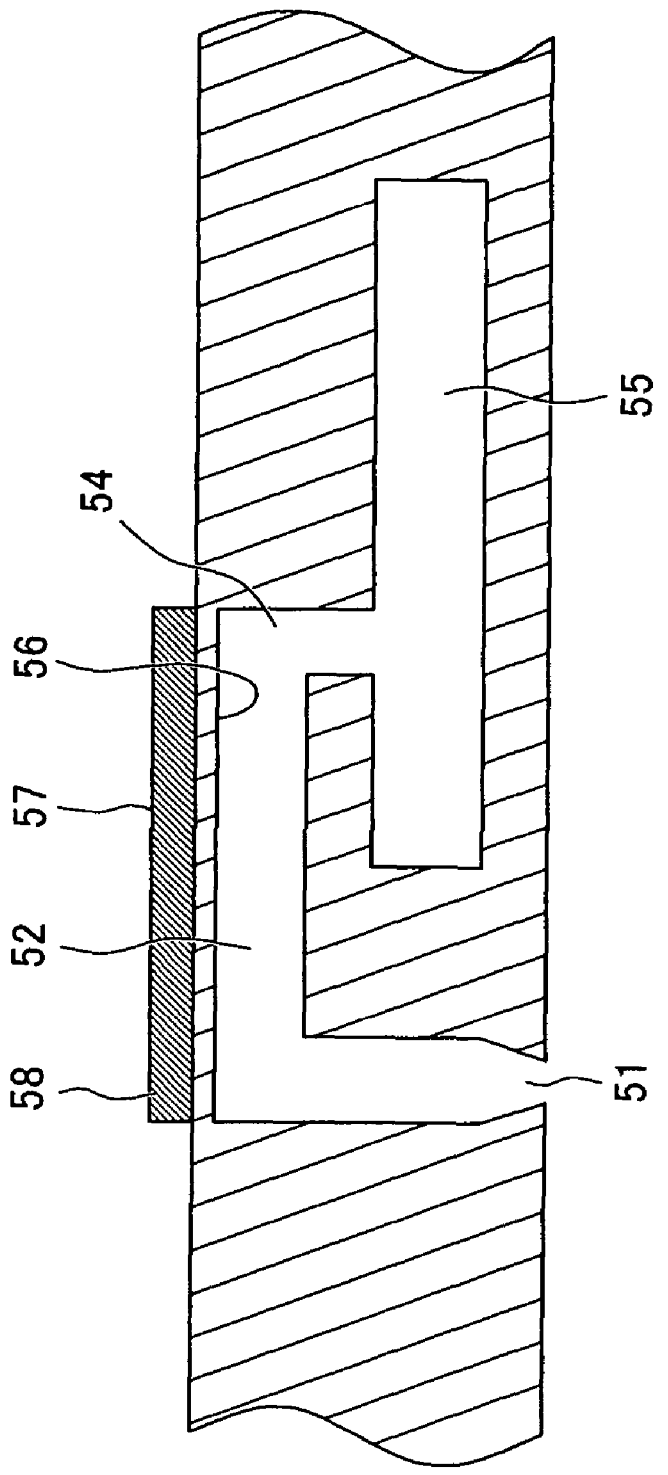
FIG. 7 is a sectional view along line 7-7 in FIGS. 6A and 6B.

FIG. 7 is a sectional view along line 7-7 in FIGS. 6A and 6B. As shown in FIG. 7, for each of the pressure chamber units 53, one end of the pressure chamber 52 is communicated with the nozzle 51, and the other end is communicated with a common channel 55 via the supply port 54. The common channel 55 has stored therein a predetermined liquid (the treatment liquid or one of the inks), this liquid being supplied into the pressure chamber 52 via the supply port 54.

A diaphragm 56 that constitutes a ceiling of the pressure chamber 52 joins to a piezoelectric element (piezoelectric actuator) 58 provided with an individual electrode 57. In the present example, the diaphragm 56 is made of a conductive material, and thus also acts as a common electrode for the piezoelectric elements 58 for the plurality of pressure chamber units 53. A piezoelectric body can be suitably used for the piezoelectric element 58. Upon a driving voltage being applied to the individual electrode 57 of the piezoelectric element 58, the piezoelectric element 58 deforms, whereby the liquid (treatment liquid or ink) in the pressure chamber 52 is pressurized, and hence a droplet is ejected from the nozzle 51. After the droplet has been ejected, new liquid is supplied into the pressure chamber 52 from the common channel 55 via the supply port 54, so as to become ready for the next ejection operation.

When embodiments of the present invention are achieved, the nozzle arrangement is not limited to the example shown above. Moreover, in the present example, a piezoelectric system in which a droplet is ejected using deformation of a piezoelectric element 58 is used; however, there is no limitation to this when embodiments of the present invention are achieved, and it is also possible to use any of various other systems. For example, a thermal jet system in which the ink is heated using a heater to produce a bubble and a droplet is ejected through the pressure thus produced by the bubble, may be adopted.

Moreover, in the present embodiment, the configuration of the treatment liquid ejection head 12S is the same as that of the ink ejection heads 12K, 12C, 12M, and 12Y; however, there is no limitation to this when embodiments of the present invention are achieved. For example, the treatment liquid may be applied onto the recording medium using a transferring medium such as a roller.

Figure 8:
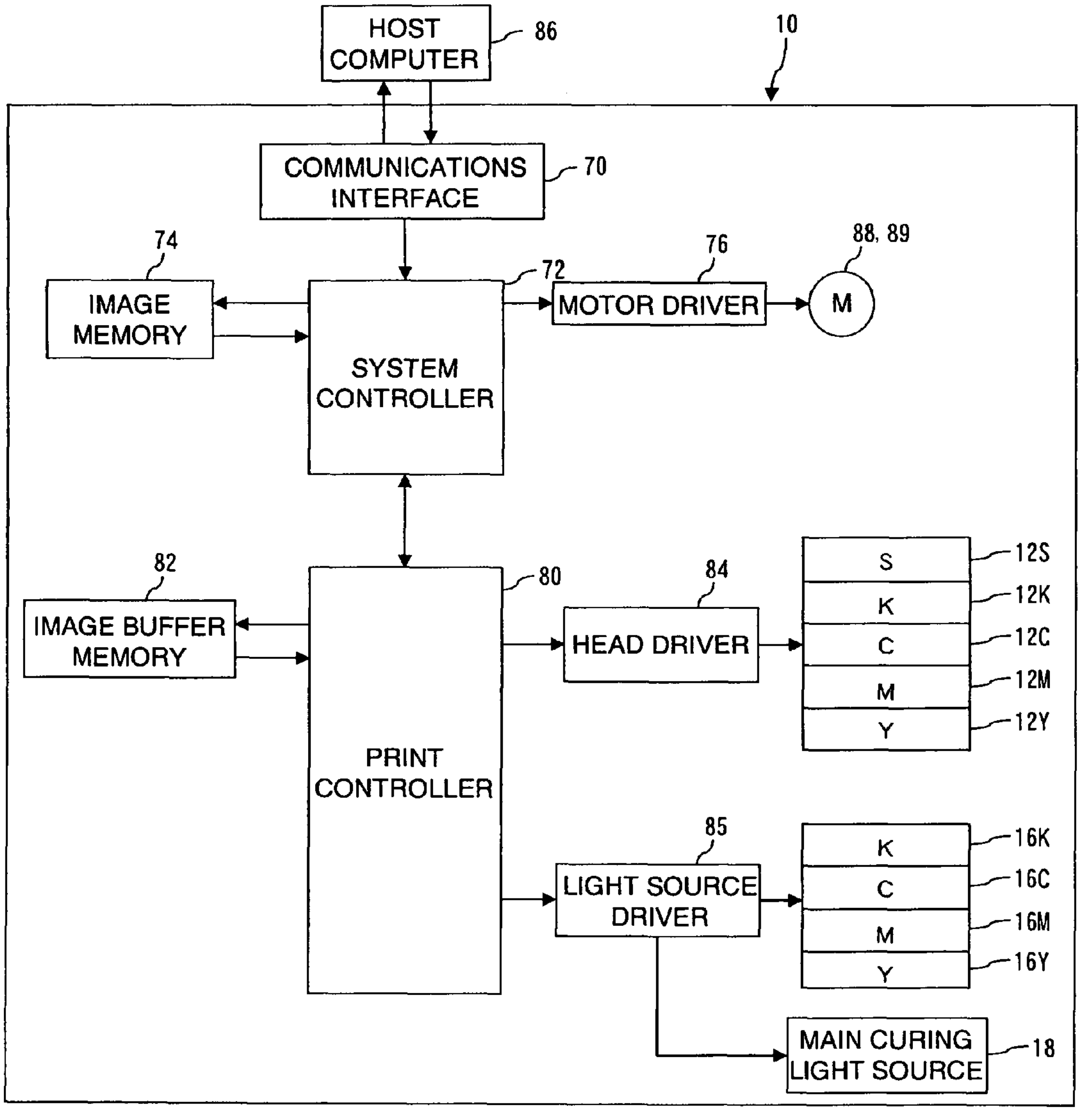
FIG. 8 is a principal block diagram showing the system configuration of the inkjet recording apparatus.

Next, the control system of the inkjet recording apparatus 10 is described below with reference to FIG. 8. FIG. 8 is a principal block diagram showing the system configuration of the inkjet recording apparatus. The inkjet recording apparatus 10 comprises a communications interface 70, a system controller 72, an image memory 74, a light source driver 85, a motor driver 76, a print controller 80, an image buffer memory 82, a head driver 84, and so on.

The communications interface 70 is an interface unit for receiving image data sent from a host computer 86. A serial interface or a parallel interface may be used as the communications interface 70. A buffer memory (not shown) may be installed in this section in order to increase the communication speed.

The image data sent from the host computer 86 is received by the inkjet recording apparatus 10 via the communications interface 70, and is temporarily stored in the image memory 74. The image memory 74 is a storage device for temporarily storing images inputted via the communications interface 70, and data is written and read to and from the image memory 74 by the system controller 72. The image memory 74 is not limited to being a memory composed of semiconductor elements, but rather a hard disk drive or another magnetic medium may also be used.

The system controller 72 is a controller that controls the various units such as the communications interface 70, the image memory 74, and the motor driver 76. The system controller 72 is constituted from a central processing unit (CPU), peripheral circuits, and so on. The system controller 72 carries out control of communication with the host computer 86, control of writing and reading to and from the image memory 74, and so on; and also produces control signals for controlling a conveying motor 88 for driving the suction belt conveyance unit 22, and light source moving motors 89 for moving the preliminary curing light sources 16K, 16C, 16M, and 16Y in the paper conveyance direction.

The motor driver 76 is a driver (driving circuit) that drives the conveying motor 88 and the light source moving motors 89 in accordance with commands from the system controller 72. A motor driver for the light source moving motors 89 may be separately provided.

The print controller 80 is a controller that has a signal processing function of carrying out various processing, corrections and so on for producing printing controlling signals from the image data in the image memory 74 in accordance with control by the system controller 72, and supplies the printing control signals (dot data) thus produced to the head driver 84 and the light source driver 85.

The head driver 84 is a driver (driving circuit) that drives the piezoelectric elements 58 of the ejection heads 12S, 12K, 12C, 12M, and 12Y on the basis of the dot data supplied from the print controller 80. Moreover, the light source driver 85 is a driver (driving circuit) that drives the preliminary curing light sources 16K, 16C, 16M, and 16Y, and the main curing light source 18 on the basis of the dot data supplied from the print controller 80. The head driver 84 and the light source driver 85 may each include a feedback control system for keeping the head driving conditions constant.

The print controller 80 is provided with the image buffer memory 82; and image data, parameters, and other data are temporarily stored in the image buffer memory 82 when image data is processed in the print controller 80. The example shown in FIG. 8 is one in which the image buffer memory 82 accompanies the print controller 80; however, the image memory 74 may also serve as the image buffer memory 82. Also possible is an aspect in which the print controller 80 and the system controller 72 are integrated to form a single processor.

In particular, in the present embodiment, the print controller 80 changes the distance L (Lk, Lc, Lm, or Ly) from each ink ejection head 12K, 12C, 12M, or 12Y to the corresponding preliminary curing light source 16K, 16C, 16M, or 16Y, in accordance with the recording density or the deposition amount for the ink ejection head 12K, 12C, 12M, or 12Y based on the dot data produced on the basis of the image data. Thereby, the time T from each of the ink ejection heads 12K, 12C, 12M, and 12Y depositing an ink droplet to the UV irradiation being carried out is adjusted, whereby a desired dot size (desired dot diameter) can be achieved in accordance with the recording density or the deposition amount for each of the ink ejection heads 12K, 12C, 12M, and 12Y.

Figure 9:
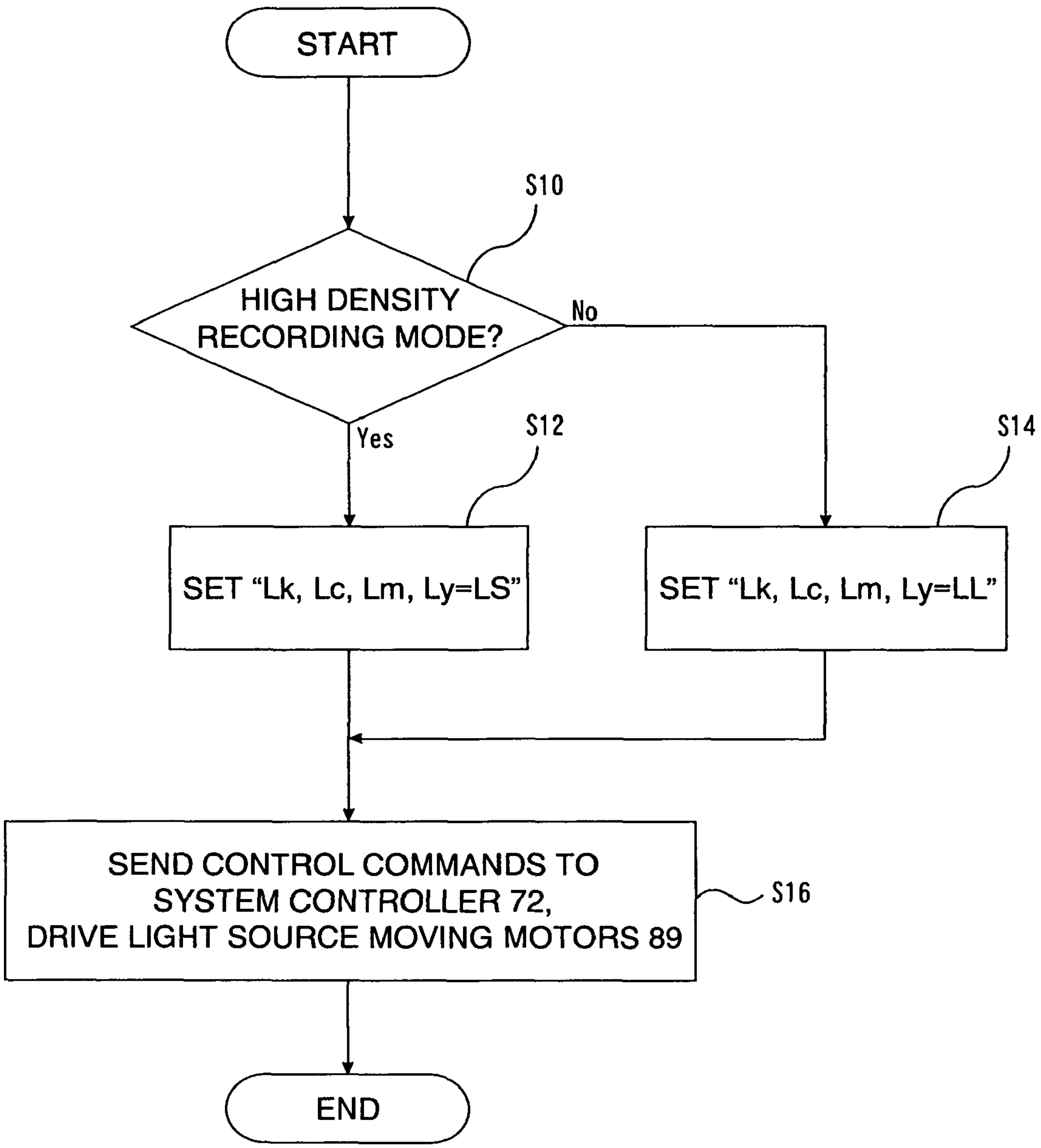
FIG. 9 is a flowchart showing procedures for setting distances L from ink ejection heads to preliminary curing light sources, and showing the case that the distances L are changed in accordance with the recording density.
Figure 10:
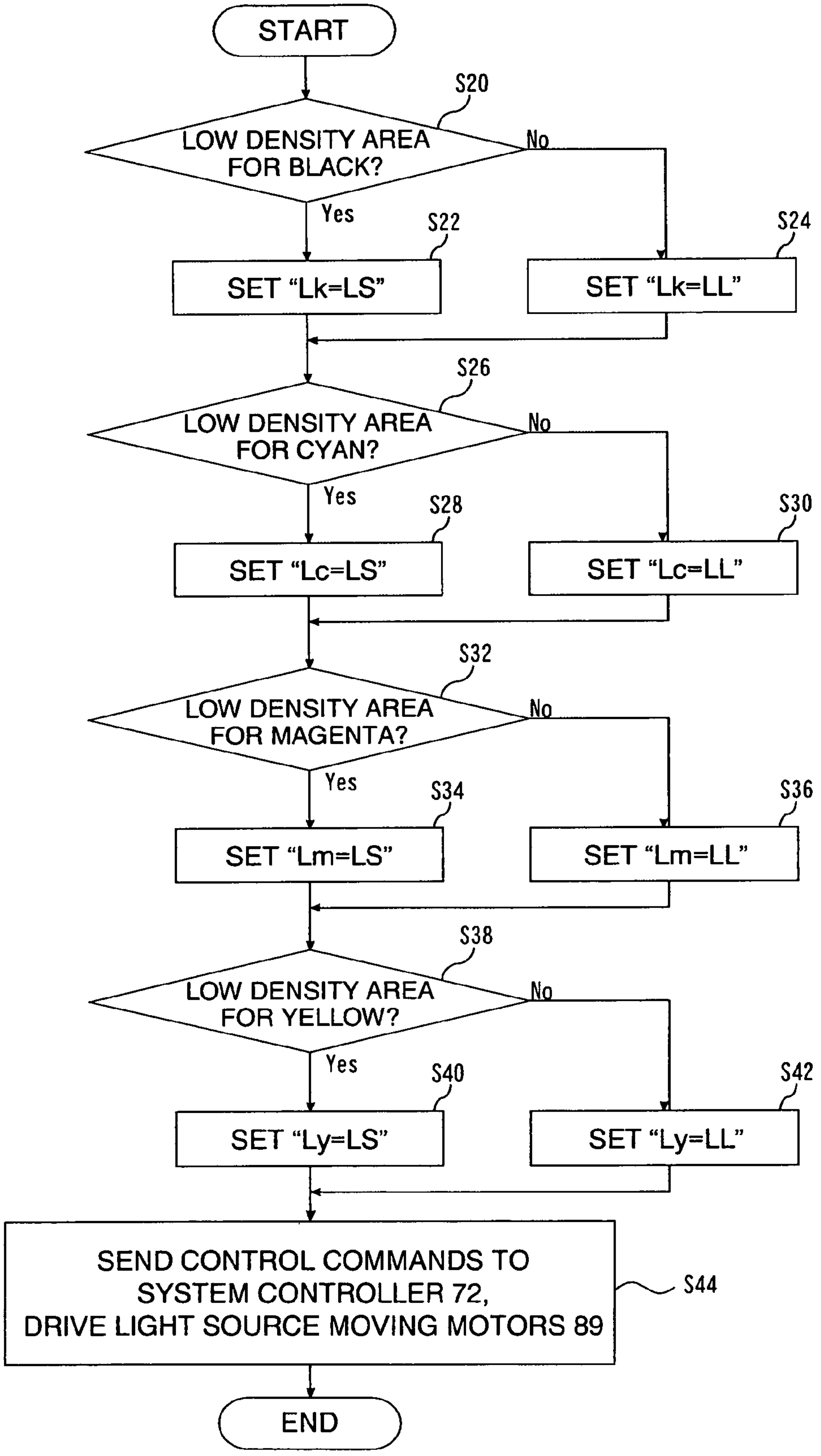
FIG. 10 is a flowchart showing procedures for setting the distances L from the ink ejection heads to the preliminary curing light sources, and showing the case that the distances L are changed in accordance with the deposition amount.

FIGS. 9 and 10 are flowcharts showing procedures for setting the distance L (Lk, Lc, Lm, or Ly) from each ink ejection head 12K, 12C, 12M, or 12Y to the corresponding preliminary curing light source 16K, 16C, 16M, or 16Y.

FIG. 9 shows the case in which each distance L is changed in accordance with the recording density. In the present example, the recording density is categorized into two types, high density and low density; however, there is no particular limitation to this. First, the print controller 80 determines whether or not the recording mode is the high density recording mode (step S1). If the high density recording mode is adopted (i.e. in the case of "Yes"), then Lk, Lc, Lm, and Ly are each set to LS in step S12. On the other hand, if the high density recording mode is not adopted (i.e. in the case of "No"), namely, if the low density recording mode is adopted, then Lk, Lc, Lm, and Ly are each set to LL in step S14. Each of LL and LS is a constant representing a distance chosen as appropriate, and "LL>LS" is satisfied. After step S12 or step S14 has been completed, the print controller 80 sends control commands (control signals) to the system controller 72, and then the light source moving motors 89 are driven via the motor driver 76 such that the distances from the ink ejection heads 12K, 12C, 12M, and 12Y to the preliminary curing light sources 16K, 16C, 16M, and 16Y become Lk, Lc, Lm, and Ly respectively, in step S16.

FIG. 10 shows the case in which each distance L is changed in accordance with the deposition amount. In the present example, the deposition amount is categorized into two types, high density and low density, but there is no particular limitation to this. First, the print controller 80 determines whether the area for black being printed is a low optical density area or not (step S20). If it is determined as a low optical density area (i.e. in the case of "Yes"), then Lk is set to LS in step S22. On the other hand, if it is not determined as a low optical density area (i.e. in the case of "No"), namely, if it is determined as a high optical density area, Lk is set to LL in step S24. LL and LS satisfy "LL>LS", as in the case of FIG. 9. Next, the same processing as for black is carried out for each of the colors cyan, magenta, and yellow (steps S26 to S42). In this way, Lk, Lc, Lm, and Ly are each set to LS or LL in accordance with the deposition amount for each color (black, cyan, magenta, or yellow). After that, the print controller 80 sends control commands to the system controller 72, and the light source moving motors 89 are driven in step S44, as in step S16 in FIG. 9.

Description of Treatment Liquid and Inks (Ink Set)

A detailed description is given of the ink set used in the inkjet recording apparatus 10 according to an embodiment of the present invention. In the inkjet recording apparatus 10 shown in the present embodiment, an ink set is constituted from a treatment liquid containing a radiation curing initiator (hereinafter sometimes referred to as a "polymerization initiator"), a diffusion preventing agent, and a high-boiling organic solvent or a radiation-curable polymerizable compound (hereinafter sometimes referred to as a "polymerizable compound"), and various colored inks each containing a polymerizable compound and a coloring material.

Polymerizable Compounds (Radiation-curable Monomers and Oligomers)

"Polymerizable compound" refers to a compound that has a capability of undergoing polymerization and hence curing through the action of initiating species such as radicals generated from a polymerization initiator, described below.

Each polymerizable compound is preferably an addition polymerization-undergoing compound having at least one ethylenic unsaturated double bond therein, and is preferably selected from polyfunctional compounds having at least one terminal ethylenic unsaturated bond, more preferably at least two terminal ethylenic unsaturated bonds, therein. The group of such compounds is widely known in the industrial field in question, and these compounds can be used with no particular limitations thereon. These compounds include, for example, ones having chemical forms such as monomers, and prepolymers, i.e. dimers, trimers and other oligomers, and mixtures or copolymers thereof.

The polymerizable compound preferably has a polymerizable group such as an acryloyl group, a methacryloyl group, an allyl group, a vinyl group, or an internal double bond group (maleic acid etc.) in the molecule thereof. Of these, a compound having an acryloyl group or a methacryloyl group is preferable since the curing reaction can be brought about with little energy.

In each liquid, one polymerizable compound only may be used, or a plurality of polymerizable compounds may be used in combination.

The polymerizable compound content in the second liquid containing colorant is preferably in a range of 50 to 99% by mass, more preferably 70 to 99% by mass, yet more preferably 80 to 99% by mass, of the second liquid.

Polymerization Initiators (Curing Initiators, Reaction Initiators)

"Polymerization initiator" refers to a compound that generates initiating species such as radicals through light, or heat, or both of these types of energy, thus initiating and promoting the polymerization of the polymerizable compound(s). A publicly known thermal polymerization initiator, a compound having therein a bond with low bond dissociation energy, a photopolymerization initiator, or the like can be selected and used.

Examples of such radical generating agents include halogenated organic compounds, carbonyl compounds, organic peroxide compounds, azo type polymerization initiators, azide compounds, metallocene compounds, hexaarylbiimidazole compounds, organic borate compounds, disulfonic acid compounds, and onium salt compounds.

In the ink set of an embodiment the present invention, a polymerization initiator that cures the polymerizable compound(s) is contained in at least one of the plurality of liquids used.

From the viewpoint of stability over time, curability and curing rate, the polymerization initiator content is preferably 0.5 to 20% by mass, more preferably 1 to 15% by mass, yet more preferably 3 to 10% by mass, relative to all of the polymerizable compounds used in the ink set.

One polymerization initiator may be used, or a plurality of polymerization initiators may be used in combination. Moreover, so long as there is no impairment of the effects of the present invention, the polymerization initiator(s) may be used together with a publicly known sensitizer with an object of improving the sensitivity.

Colorants (Coloring Materials)

There are no particular limitations on the colorants used in an embodiment of the present invention. So long as these colorants are such that a hue and color density suitable for the ink usage can be attained, ones selected as appropriate from publicly known water-soluble dyes, oil-soluble dyes and pigments can be used. Of these, from the viewpoint of ink droplet ejection stability and quick drying ability, the liquids constituting the inkjet recording inks in the present invention are preferably water-insoluble liquids not containing an aqueous solvent. From this viewpoint, it is preferable to use an oil-soluble dye or pigment that readily disperses or dissolves uniformly in the water-insoluble liquid.

There are no particular limitations on oil-soluble dyes that can be used in the present invention, with it being possible to use one chosen as desired. The dye content in the case of using an oil-soluble dye as a colorant is preferably in a-range of 0.05 to 20% by mass, more preferably 0.1 to 15% by mass, particularly preferably 0.2 to 6% by mass, in terms of solid content.

A mode in which a pigment is used as a colorant is preferable from the viewpoint of aggregation readily occurring when the plurality of liquids are mixed together.

As pigments that can be used in the present invention, either organic pigments or inorganic pigments can be used. A carbon black pigment is preferable as a black pigment. In general, a black pigment, and pigments of the three primary colors, cyan, magenta and yellow, are used; however, pigments having other hues, for example red, green, blue, brown or white pigments, pigments having a metallic luster such as gold or silver pigments, uncolored or light body pigments, and so on may also be used in accordance with the object.

Moreover, particles obtained by fixing a dye or a pigment to the surface of a core material made of silica, alumina, a resin or the like, an insoluble lake pigment obtained from a dye, a colored emulsion, a colored latex, or the like may also be used as a pigment.

Furthermore, a resin-coated pigment may also be used. Such a resin-coated pigment is known as a "microcapsule pigment", and is commercially available from manufacturers such as Dainippon Ink and Chemicals Inc. and Toyo Ink Mfg. Co., Ltd.

From the viewpoint of the balance between the optical density and the storage stability, the volume average particle diameter of the pigment particles contained in a liquid in the present invention is preferably in a range of 30 to 250 nm, more preferably 50 to 200 nm. Here, the volume average particle diameter of the pigment particles can be measured, for example, using a measuring apparatus such as an LB-500 (made by HORIBA Ltd.).

From the viewpoint of the optical density and the ejection stability, the pigment content in the case of using a pigment as a colorant is preferably in a range of 0.1 to 20% by mass, more preferably 1 to 10% by mass, in terms of solid content in each second liquid.

One colorant only may be used, or a plurality of colorants may be used mixed together. Moreover, different colorants, or the same colorants, may be used in each of the liquids.

Diffusion Preventing Agents (Polymers)

In an embodiment of the present invention, "diffusion preventing agent" refers to a substance contained in the first liquid with an object of preventing diffusion and smearing of the colorant-containing second liquids of which droplets are deposited onto the first liquid that has been put onto the recording medium.

As such a diffusion preventing agent, there is contained at least one selected from the group of polymers having an amino group, polymers having an onium group, polymers having a nitrogen-containing hetero ring, and metal compounds.

One of the above polymers or the like may be used, or a plurality may be used in combination. "Plurality" includes both, for example, the case of polymers that are polymers having an amino group but have different structures to one another, and the case of different types such as a polymer having an amino group and a polymer having an onium group. Moreover, a combination selected from amino groups, onium groups, nitrogen-containing hetero rings, and metal compounds may be present together in one molecule.

Following is a detailed description of these polymers and so on.

Polymers Having an Amino Group

A homopolymer of an only monomer having an amino group, or a copolymer of a monomer of an amino group and another monomer may be used as a polymer having an amino group. The "monomer having an amino group" content in the polymer having an amino group is preferably not less than 10 mol % but not more than 100 mol %, more preferably not less than 20 mol % but not more than 100 mol %.

Examples of monomers having an amino group include N,N-dimethylaminoethyl (meth)acrylate, N,N-diethylaminoethyl (meth)acrylate, N,N-dimethylaminopropyl (meth) acrylate, N,N-diethylaminopropyl (meth)acrylate, N,N-dimethylaminoethyl (meth)acrylamide, N,N-diethylaminoethyl (meth)acrylamide, N,N-dimethylaminopropyl (meth)acrylamide, N,N-diethylaminopropyl (meth)acrylamide, diallylamine, N-methyldiallylamine, N-vinylbenzyl-N,N-dimethylamine, N-vinylbenzyl-N,N-diethylamine, N-vinylbenzyl-N-ethyl-N-methylamine, N-vinylbenzyl-N,N-dihexylamine, N-vinylbenzyl-N-octadecyl-N-methylamine, N-vinylbenzyl-N'-methyl-piperazine, N-vinylbenzyl-N'-(2-hydroxyethyl)-piperazine, N-benzyl-N-methylaminoethyl (meth)acrylate, and N,N-dibenzylaminoethyl (meth)acrylate.

Of these, N,N-dimethylaminoethyl(meth)acrylate, N,N-diethylaminoethyl(meth)acrylate, N,N-dimethylaminopropyl(meth)acrylate, N,N-diethylaminopropyl(meth)acrylate, N,N-dimethylaminoethyl(meth)acrylamide, N,N-diethylaminoethyl(meth)acrylamide, N,N-dimethylaminopropyl (meth)acrylamide, and N,N-diethylaminopropyl(meth)acrylamide are more preferable, with N,N-dimethylaminoethyl (meth)acrylate, N,N-diethylaminoethyl(meth)acrylate, and N,N-dimethylaminopropyl(meth)acrylamide being particularly preferable.

Examples of monomers that can be copolymerized with these monomers include (meth)acrylic acid alkyl esters (e.g. (meth)acrylic acid alkyl esters having 1 to 18 carbon atoms in the alkyl part thereof such as methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, and stearyl (meth)acrylate), (meth)acrylic acid cycloalkyl esters (e.g. cyclohexyl (meth)acrylate, etc.), (meth)acrylic acid aryl esters (e.g. phenyl(meth)acrylate, etc.), (meth)acrylic acid aralkyl esters (e.g. benzyl(meth)acrylate, etc.), substituted (meth)acrylic acid alkyl esters (e.g. 2-hydroxyethyl (meth) acrylate, etc.), (meth)acrylamides (e.g. (meth)acrylamide, dimethyl(meth)acrylamide, etc.), aromatic vinyl compounds (e.g. styrene, vinyltoluene, $\alpha$-methylstyrene, etc.), vinyl esters (e.g. vinyl acetate, vinyl propionate, vinyl versatate, etc.), allyl esters (e.g. allyl acetate, etc.), halogen-containing monomers (e.g. vinylidene chloride, vinyl chloride, etc.), vinyl cyanides (e.g. (meth)acrylonitrile, etc.), and olefins (e.g. ethylene, propylene, etc.).

Of these copolymerizable monomers, (meth)acrylic acid alkyl esters having an alkyl group having 1 to 8 carbon atoms, benzyl (meth)acrylate, and styrene are preferable, with ethyl (meth)acrylate, propyl (meth)acrylate, n-butyl (meth)acrylate, n-hexyl (meth)acrylate, and 2-ethylhexyl (meth)acrylate being particularly preferable.

Furthermore, other polymers having an amino group include polyallylamine, polyvinylamine, polyethyleneimine, polydiallylamine, poly(N-methyldiallylamine), poly(N-ethyldiallylamine), and modified compounds thereof (a-benzyl chloride adduct, a phenyl glycidyl ether adduct, and an acrylonitrile adduct of polyallylamine), and polyadducts between a diisocyanate (e.g. hexamethylene diisocyanate, isophorone diisocyanate, toluene diisocyanate, or xylylene diisocyanate) and a diol having a tertiary amino group (e.g. N-methyldiethanolamine, N-ethyldiethanolamine, or N,N'-3-hydroxypropylpiperazine).

Of these, polyallylamine, polyvinylamine, polyethyleneimine, and modified compounds thereof are preferable, with a modified compound of polyallylamine being particularly preferable.

In the present invention, as a polymer having an amino group, a polymer having therein a unit represented by the following general formula (1) is particularly preferable.

(GENERAL FORMULA 1)

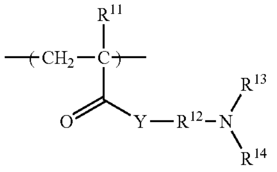

In general formula (1), $R^{11}$ represents hydrogen or a methyl group, Y represents O or $NR^{15}$, $R^{15}$ represents hydrogen or an alkyl group, $R^{12}$ represents a bivalent connecting group, and $R^{13}$ and $R^{14}$ each independently represents an alkyl group, an aralkyl group, or an aryl group.

Hydrogen is more preferable as $R^{11}$, O or NH is more preferable as Y, with O being yet more preferable, and an alkyl group or an aralkyl group is more preferable as each of $R^{13}$ and $R^{14}$, with an alkyl group being yet more preferable.

As the bivalent connecting group represented by $R^{12}$, an alkylene group or an arylene group is preferable, with an alkylene group being more preferable.

Specific examples of the bivalent connecting group include a methylene group, an ethylene group, a propylene group, a trimethylene group, a tetramethylene group, a hexamethylene group, an octamethylene group, a phenylene group, and a 2-hydroxypropylene group. Of these, an ethylene group, a propylene group, and a trimethylene group are preferable.

As an alkyl group represented by $R^{13}$, $R^{14}$ or $R^{15}$, an alkyl group having not more than 18 carbon atoms is preferable, with an alkyl group having not more than 12 carbon atoms being more preferable, and an alkyl group having not more than 8 carbon atoms being particularly preferable. The alkyl group may be straight chain, or cyclic, and may have substituents, examples of the substituents including a hydroxy group, alkoxy groups (e.g. a methoxy group, an ethoxy group, a propoxy group, etc.), aryloxy groups (e.g. a phenoxy group, etc.), amino groups, carbamoyl groups, and halogen atoms.

Specific examples of such (substituted) alkyl groups include a methyl group, an ethyl group, an n-propyl group, an isopropyl group, an n-butyl group, an isobutyl group, a t-butyl group, an n-hexyl group, a cyclohexyl group, a 2-ethylhexyl group, an n-octyl group, an n-nonyl group, an n-decyl group, an n-dodecyl group, an n-octadecyl group, a hydroxyethyl group, a 1-hydroxypropyl group, an N,N-dimethylaminoethyl group, a methoxyethyl group, and a chloroethyl group. Of these, a methyl group, an ethyl group, an n-propyl group, an isopropyl group, an n-butyl group, an isobutyl group, a t-butyl group, an n-hexyl group, a cyclohexyl group, a 2-ethylhexyl group, an n-octyl group, an n-nonyl group, and an n-decyl group are more preferable, with a methyl group, an ethyl group, an n-propyl group, an n-butyl group, and an n-hexyl group being particularly preferable.

As an aryl group represented by $R^{13}$ or $R^{14}$, an aryl group having not more than 18 carbon atoms is preferable, with an aryl group having not more than 16 carbon atoms being more preferable, and an aryl group having not more than 12 carbon atoms being particularly preferable. Moreover, the aryl group may have substituents.

Specific examples of such (substituted) aryl groups include a phenyl group, alkylphenyl groups (e.g. a methylphenyl group, an ethylphenyl group, an n-propylphenyl group, an n-butylphenyl group, a cumenyl group, a mesityl group, a tolyl group, a xylyl group, etc.), a naphthyl group, a chlorophenyl group, a dichlorophenyl group, a trichlorophenyl group, a bromophenyl group, a hydroxyphenyl group, a methoxyphenyl group, an acetoxyphenyl group, and a cyanophenyl group. Of these, a phenyl group and a naphthyl group are particularly preferable.

As an aralkyl group represented by $R^{13}$ or $R^{14}$, an aralkyl group having not more than 18 carbon atoms is preferable, with an aralkyl group having not more than 16 carbon atoms being more preferable, and an aralkyl group having not more than 12 carbon atoms being particularly preferable. Examples of the alkyl part of the aralkyl group are alkyl groups as above, and examples of the aryl part of the aralkyl group are aryl groups as above. Moreover, the aralkyl group may have substituents.

Specific examples of such (substituted) aralkyl groups include a benzyl group, a phenylethyl group, a vinylbenzyl group, a hydroxyphenylmethyl group, a diphenylmethyl group, a trityl group, and a styryl group. Of these, a benzyl group is particularly preferable.

Preferable specific examples of polymers having units represented by the general formula (1) are as follows.
P1-1
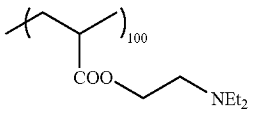
P1-2
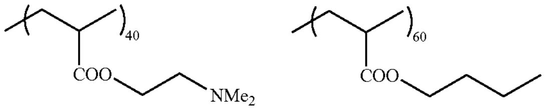
P1-3
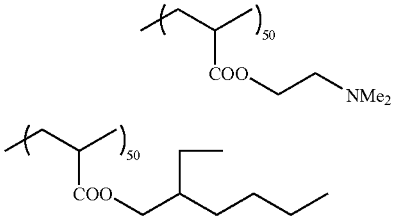
P1-4
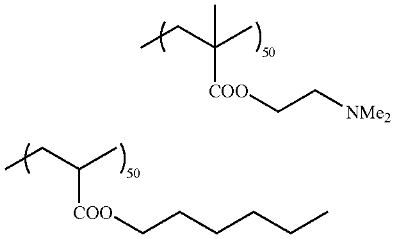
P1-5
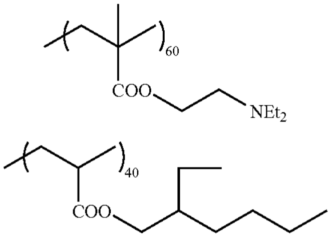
P1-6
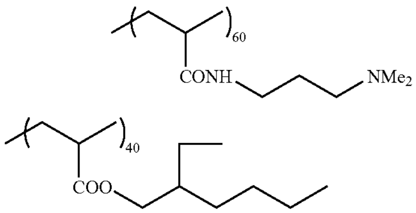
P1-7
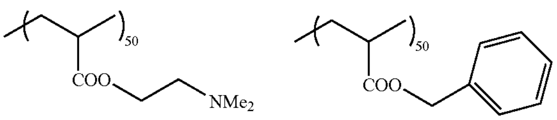
P1-8
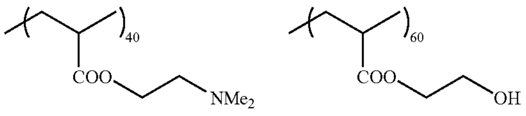
-continued
P1-9
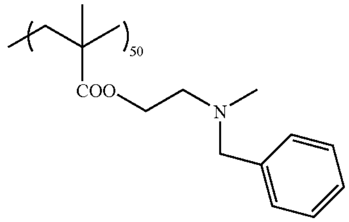
P1-10
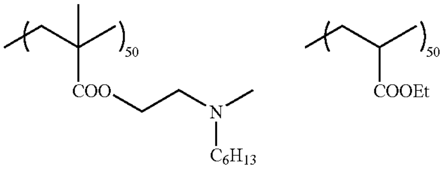
P1-11
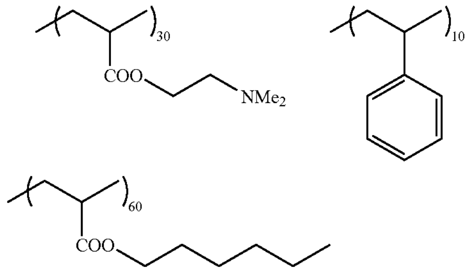
P1-12
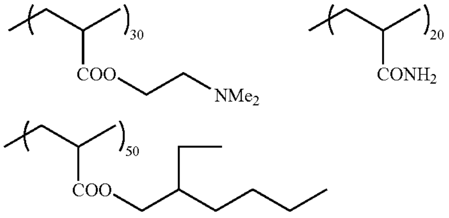
P1-13
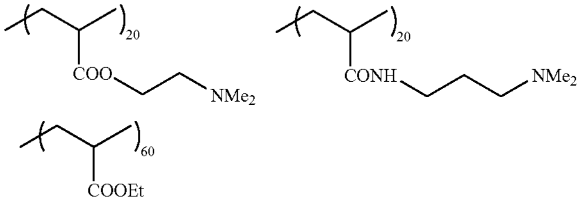
P1-14
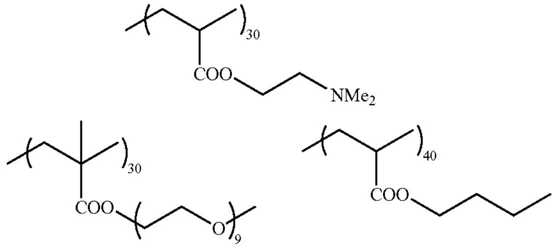
Preferable polymers having an amino group according to the present invention other than polymers having units represented by general formula (1) are as follows.

P1-15

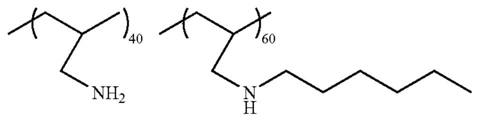

P1-16

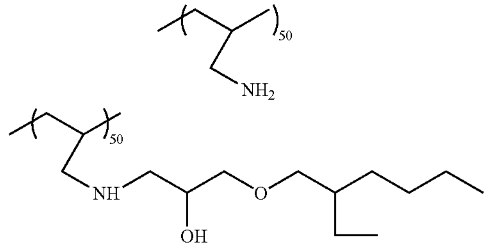

P1-17

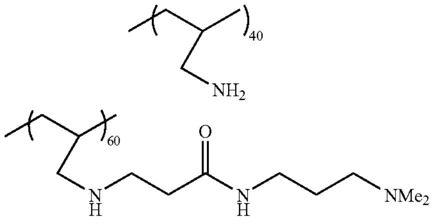

P1-18

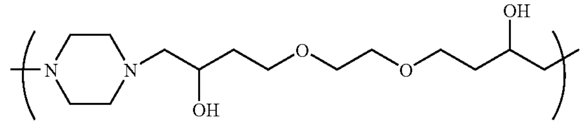

A polymer having therein a unit represented by general formula (1) can be synthesized using radical (co)polymerization. As the radical (co)polymerization, for example, a publicly known method such as bulk polymerization, solution polymerization, or emulsion polymerization can be used. However, there is no limitation to such a method, with it also being possible to use another publicly known method.

The weight average molecular weight of a polymer having an amino group used in the present invention is preferably in a range of 1000 to 50000, particularly preferably 2000 to 30000.

It is preferable for such a polymer having an amino group to be contained in at least one liquid not containing a colorant. The amount used of the polymer having an amino group in the present invention is preferably in a range of 1 to 90% by mass, more preferably 10 to 75% by mass, particularly preferably 20 to 50% by mass, relative to all of each liquid. If the amount used is less than this, then it may not be possible to realize the effects of the present invention effectively, whereas if the amount used is greater than this, then the viscosity may become high, and hence problems with the ink ejectability may arise.

Polymers Having an Onium Group

A polymer having an onium group may be a homopolymer of only a monomer having an onium group, or a copolymer of a monomer having an onium group and another monomer. The "monomer having an onium group" content in the polymer having an onium group is preferably not less than 10 mol %, more preferably not less than 20 mol %.

Examples of the onium group are an ammonium group, a phosphonium group, and a sulfonium group, with an ammonium group being preferable. A polymer having an ammonium group can be obtained as a homopolymer of a monomer having a quaternary ammonium salt group, or a copolymer or a condensation polymer between a monomer having a quaternary ammonium salt group and another monomer.

In the present invention, as a polymer having an ammonium group, a polymer having therein at least a unit represented by the following general formula (2) or (3) is particularly preferable.

(GENERAL FORMULA 2)

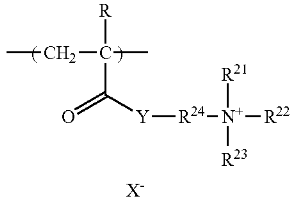

(GENERAL FORMULA 3)

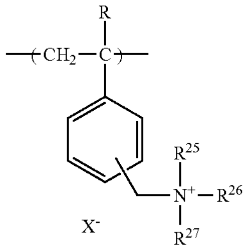

In the formulae, R represents a hydrogen atom or a methyl group, and $R^{21}$ to $R^{23}$ and $R^{25}$ to $R^{27}$ each independently represent an alkyl group, an aralkyl group, or an aryl group. $R^{24}$ represents an alkylene group, an aralkylene group, or an arylene group. Y represents O or NR', and R' represents a hydrogen atom or an alkyl group. $X^-$ represents a counter anion.

As an alkyl group represented by one of $R^{21}$ to $R^{23}$ and $R^{25}$ to $R^{27}$, an alkyl group having not more than 18 carbon atoms is preferable, with an alkyl group having not more than 16 carbon atoms being more preferable, and an alkyl group having not more than 12 carbon atoms being particularly preferable. The alkyl group may be straight chain, or cyclic, and may have substituents, examples of the substituents including alkoxy groups, aryloxy groups, halogen atoms, a hydroxyl group, carbamoyl groups, and amino groups.

Specific examples of such (substituted) alkyl groups include a methyl group, an ethyl group, an n-propyl group, an isopropyl group, an n-butyl group, an isobutyl group, a t-butyl group, an n-hexyl group, a cyclohexyl group, a 2-ethylhexyl group, an n-octyl group, an n-nonyl group, an n-decyl group, an n-dodecyl group, an n-octadecyl group, a hydroxyethyl group, a 1-hydroxypropyl group, an N,N-dimethylaminoethyl group, a methoxyethyl group, and a chloroethyl group.

Of these alkyl groups, a methyl group, an ethyl group, an n-propyl group, an isopropyl group, an n-butyl group, an isobutyl group, a t-butyl group, an n-hexyl group, a cyclohexyl group, a 2-ethylhexyl group, an n-octyl group, an n-nonyl group, and an n-decyl group are more preferable, with a methyl group, an ethyl group, an n-propyl group, an n-butyl group, and an n-hexyl group being particularly preferable.

As an aryl group represented by one of $R^{21}$ to $R^{23}$ and $R^{25}$ to $R^{27}$, an aryl group having not more than 18 carbon atoms is preferable, with an aryl group having not more than 16 carbon atoms being more preferable, and an aryl group having not more than 12 carbon atoms being particularly preferable. Moreover, the aryl group may have substituents, examples of the substituents including alkyl groups, alkoxy groups, aryloxy groups, halogen atoms, a hydroxyl group, carbamoyl groups, a cyano group, and amino groups.

Specific examples of such (substituted) aryl groups include a phenyl group, alkylphenyl groups (e.g. a methylphenyl group, an ethylphenyl group, an n-propylphenyl group, an n-butylphenyl group, a cumenyl group, a mesityl group, a tolyl group, a xylyl group, etc.), a naphthyl group, a chlorophenyl group, a dichlorophenyl group, a trichlorophenyl group, a bromophenyl group, a hydroxyphenyl group, a methoxyphenyl group, an acetoxyphenyl group, and a cyanophenyl group.

Of these (substituted) aryl groups, a phenyl group and a naphthyl group are particularly preferable.

As an aralkyl group represented by one of $R^{21}$ to $R^{23}$ and $R^{25}$ to $R^{27}$, an aralkyl group having not more than 18 carbon atoms is preferable, with an aralkyl group having not more than 16 carbon atoms being more preferable, and an aralkyl group having not more than 12 carbon atoms being particularly preferable. Examples of the alkyl part of the aralkyl group are alkyl groups as above, and examples of the aryl part of the aralkyl group are aryl groups as above. The alkyl part and/or the aryl part of the aralkyl group may have substituents, examples of the substituents being as given above for the alkyl group and the aryl group.

Specific examples of such (substituted) aralkyl groups include a benzyl group, a phenylethyl group, a vinylbenzyl group, a hydroxyphenylmethyl group, a diphenylmethyl group, a trityl group, and a styryl group.

Of these (substituted) aralkyl groups, a benzyl group is particularly preferable.

It is particularly preferable for each of $R^{21}$ to $R^{23}$ and $R^{25}$ to $R^{27}$ to be independently an alkyl group or an aralkyl group. Of these, a methyl group, an ethyl group, a hexyl group, and a benzyl group are particularly preferable.

$R^{24}$ represents a bivalent connecting group, preferably an alkylene group, an aralkylene group, or an arylene group.

An alkylene group represented by $R^{24}$ preferably has not more than 8 carbon atoms, more preferably not more than 6 carbon atoms, particularly preferably not more than 4 carbon atoms. The alkylene group may be straight chain, or cyclic, and may have substituents, examples of the substituents including alkoxy groups, aryloxy groups, halogen atoms, a hydroxyl group, carbamoyl groups, and amino groups.

Specific examples of such (substituted) alkylene groups include a methylene group, an ethylene group, a propylene group, a trimethylene group, a tetramethylene group, a hexamethylene group, an octamethylene group, a 2-hydroxyethylene group, a 2-hydroxypropylene group, and a 2-methoxypropylene group.

Of these (substituted) alkylene groups, a methylene group, an ethylene group, a propylene group, a trimethylene group, and a 2-hydroxypropylene group are preferable.

An arylene group represented by $R^{24}$ preferably has not more than 12 carbon atoms, more preferably not more than 10 carbon atoms, particularly preferably not more than 8 carbon atoms. The arylene group may have substituents, examples of the substituents being as given above for the aryl group.

Specific examples of such (substituted) arylene groups include a phenylene group, alkylphenylene groups (e.g. a 2-ethyl-1,4-phenylene group, a 2-propyl-1,4-phenylene group, etc.), a 2-chloro-1,4-phenylene group, and alkoxyphenylene groups (e.g. a 2-methoxy-1,4-phenylene group, etc.). Of these, a phenylene group is particularly preferable.

An aralkylene group represented by $R^{24}$ preferably has not more than 12 carbon atoms, more preferably not more than 10 carbon atoms, particularly preferably not more than 8 carbon atoms. Examples of the alkyl part of the aralkylene group are alkyl group as above, and examples of the aryl part of the aralkylene group are aryl groups as above. The aralkylene group may have substituents, examples of the substituents being as given above for the alkyl group and the aryl group.

Specific examples of such (substituted) aralkylene groups include a xylylene group and a benzylidene group, with a benzylidene group being particularly preferable.

It is particularly preferable for $R^{24}$ to be alkylene group, with an ethylene group or a propylene group being more preferable.

As an alkyl group represented by R', those given above as alkyl groups for $R^{21}$ to $R^{23}$ and $R^{25}$ to $R^{27}$ are preferable. Preferable specific examples are also as for $R^{21}$ to $R^{23}$ and $R^{25}$ to $R^{27}$.

"—Y—" is particularly preferably "—O—" or "—NH—".

$X^-$ is a counter anion, examples including a halide ion ($Cl^-$, $Br^-$, $I^-$), a sulfonate ion, alkylsulfonate ions, arylsulfonate ions, alkylcarboxylate ions, arylcarboxylate ions, $PF_6^-$, and $BF_4^-$. Of these, $Cl^-$, $Br^-$, a toluenesulfonate ion, a methanesulfonate ion, $PF_6^-$, and $BF_4^-$ are particularly preferable.

In the case of a polymer having therein a unit represented by general formula (2) or (3), the content of the unit represented by general formula (2) or (3) in the polymer is preferably in a range of 10 to 100 mol %, more preferably 20 to 100 mol %.

Preferable specific examples of polymers having units represented by general formula (2) or (3) are as follows.

P2-1

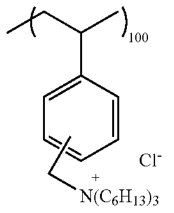

P2-2

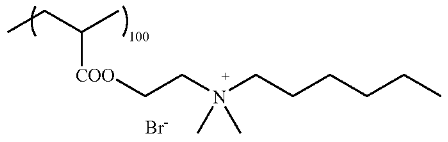

P2-3

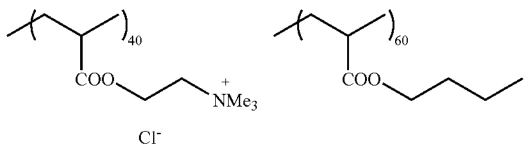

P2-4

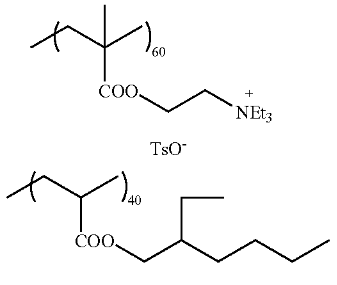

-continued

P2-5

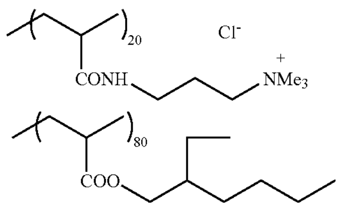

P2-6

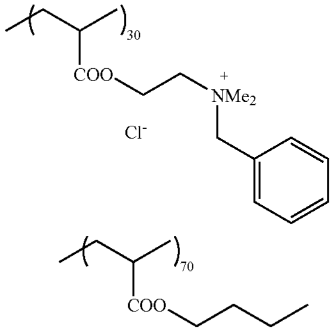

P2-7

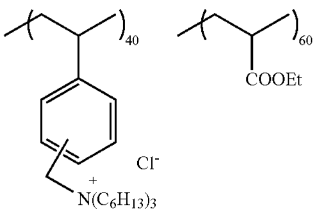

P2-8

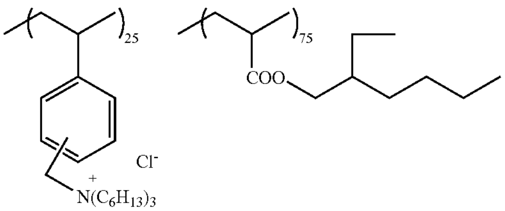

P2-9

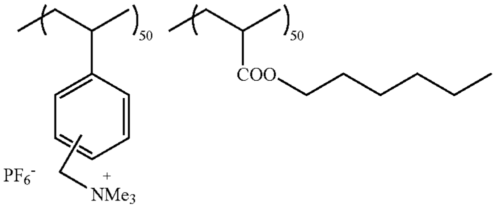

P2-10

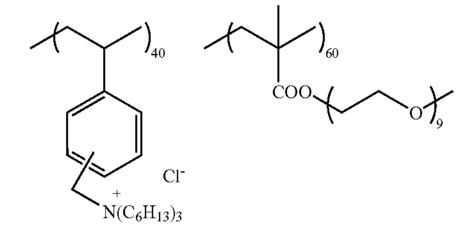

P2-11

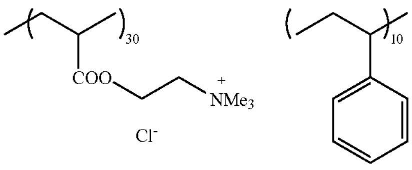

-continued

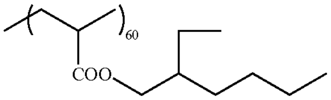

P2-12

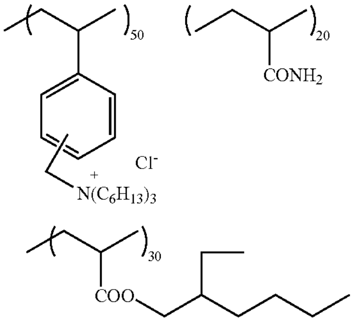

P2-13

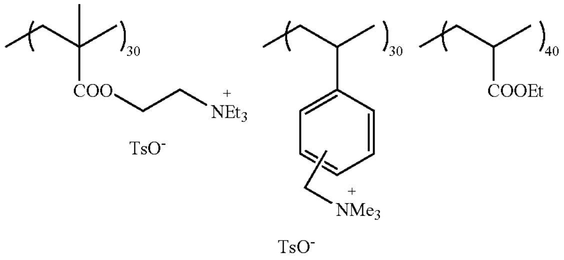

Examples of polymers having an onium group according to the present invention other than polymers having units represented by general formula (2) or (3) include epichlorohydrin-dimethylamine addition polymers, and addition polymers between a dihalide compound (e.g. xylylene dichloride, xylylene dibromide, 1,6-dibromohexane) and a diamine (N,N,N',N'-tetramethylethylenediamine, N,N,N',N'-tetramethylhexamethylenediamine, N,N'-dimethylpiperazine, diazobicyclooctane).

A polymer having an amino group (e.g. polyallylamine, polyvinylamine, polyethyleneimine, polydiallylamine, poly(N-methyldiallylamine), poly(N-ethyldiallylamine), a polyadduct between a diisocyanate (e.g. hexamethylene diisocyanate, isophorone diisocyanate, toluene diisocyanate, xylylene diisocyanate) and a diol having a tertiary amino group (e.g. N-methyldiethanolamine; N-ethyldiethanolamine, N,N'-3-hydroxypropylpiperazine), etc.) can also be obtained by adding methyl chloride, ethyl chloride, methyl bromide, ethyl bromide, methyl iodide, ethyl iodide, dimethyl sulfate, diethyl sulfate, methyl p-toluenesulfonate, or ethyl p-toluenesulfonate.

Of these, specific examples of preferable polymers are as follows.

P2-14

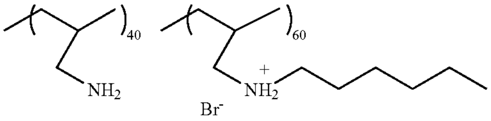

-continued

P2-15

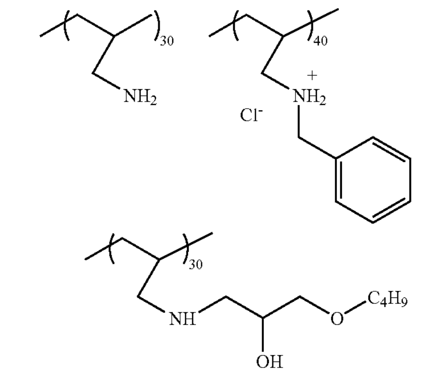

P2-16

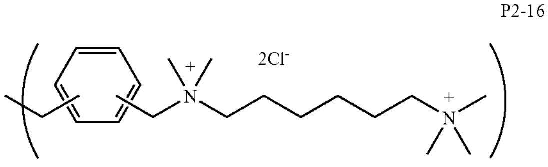

P2-17

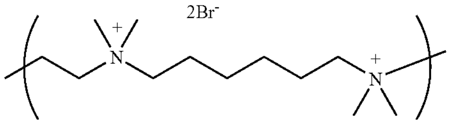

A polymer having a unit represented by general formula (2) or (3) can be obtained as a homopolymer of an undermentioned monomer having an ammonium group or a copolymer containing such a monomer.

Examples of the monomer having an ammonium group include trimethyl-p-vinylbenzyl ammonium chloride, trimethyl-m-vinylbenzyl ammonium chloride, triethyl-p-vinylbenzyl ammonium chloride, triethyl-m-vinylbenzyl ammonium chloride, N,N-dimethyl-N-ethyl-N-p-vinylbenzyl ammonium chloride, N,N-diethyl-N-methyl-N-p-vinylbenzyl ammonium chloride, N,N-dimethyl-N-n-propyl-N-p-vinylbenzyl ammonium chloride, N,N-dimethyl-N-n-octyl-N-p-vinylbenzyl ammonium chloride, N,N-dimethyl-N-benzyl-N-p-vinylbenzyl ammonium chloride, N,N-diethyl-N-benzyl-N-p-vinylbenzyl ammonium chloride, N,N-dimethyl-N-(4-methyl)benzyl-N-p-vinylbenzyl ammonium chloride, N,N-dimethyl-N-phenyl-N-p-vinylbenzyl ammonium chloride, trimethyl-p-vinylbenzyl ammonium bromide, trimethyl-m-vinylbenzyl ammonium bromide, trimethyl-p-vinylbenzyl ammonium sulfonate, trimethyl-m-vinylbenzyl ammonium sulfonate, trimethyl-p-vinylbenzyl ammonium acetate, trimethyl-m-vinylbenzyl ammonium acetate, N,N,N-triethyl-N-2-(4-vinylphenyl)ethyl ammonium chloride, N,N,N-triethyl-N-2-(3-vinylphenyl)ethyl ammonium chloride, N,N-diethyl-N-methyl-N-2-(4-vinylphenyl)ethyl ammonium chloride, N,N-diethyl-N-methyl-N-2-(4-vinylphenyl)ethyl ammonium acetate, trimethyl-2-(methacryloyloxy)ethyl ammonium chloride, triethyl-2-(methacryloyloxy)ethyl ammonium chloride, trimethyl-2-(acryloyloxy)ethyl ammonium chloride, triethyl-2-(acryloyloxy)ethyl ammonium chloride, trimethyl-3-(methacryloyloxy)propyl ammonium chloride, triethyl-3-(methacryloyloxy)propyl ammonium chloride, trimethyl-2-(methacryloylamino)ethyl ammonium chloride, triethyl-2-(methacryloylamino)ethyl ammonium chloride, trimethyl-2-(acryloylamino)ethyl ammonium chloride, triethyl-2-(acryloylamino)ethyl ammonium chloride, trimethyl-3-(methacryloylamino)propyl ammonium chloride, triethyl-3-(methacryloylamino)propyl ammonium chloride, trimethyl-3-(acryloylamino)propyl ammonium chloride, triethyl-3-(acryloylamino)propyl ammonium chloride, N,N-dimethyl-N-ethyl-2-(methacryloyloxy)ethyl ammonium chloride, N,N-diethyl-N-methyl-2-(methacryloyloxy)ethyl ammonium chloride, N,N-dimethyl-N-ethyl-3-(acryloylamino)propyl ammonium chloride, trimethyl-2-(methacryloyloxy)ethyl ammonium bromide, trimethyl-3-(acryloylamino)propyl ammonium bromide, trimethyl-2-(methacryloyloxy)ethyl ammonium sulfonate, trimethyl-3-(acryloylamino)propyl ammonium acetate, monomethyldiallyl ammonium chloride, dimethyldiallyl ammonium chloride, and allylamine hydrochloride.

Examples of monomers that can be copolymerized with these monomers include (meth)acrylic acid alkyl esters (e.g. C1-18 alkyl esters of (meth)acrylic acid such as methyl(meth)acrylate, ethyl(meth)acrylate, propyl(meth)acrylate, isopropyl(meth)acrylate, n-butyl(meth)acrylate, isobutyl(meth)acrylate, t-butyl(meth)acrylate, hexyl(meth)acrylate, octyl(meth)acrylate, 2-ethylhexyl(meth)acrylate, lauryl(meth)acrylate, and stearyl(meth)acrylate), (meth)acrylic acid cycloalkyl esters (e.g. cyclohexyl(meth)acrylate, etc.), (meth)acrylic acid aryl esters (e.g. phenyl(meth)acrylate, etc.), aralkyl esters (e.g. benzyl(meth)acrylate, etc.), substituted (meth)acrylic acid alkyl esters (e.g. 2-hydroxyethyl (meth)acrylate, etc.), (meth)acrylamides (e.g. (meth)acrylamide, dimethyl(meth)acrylamide, etc.), aromatic vinyl compounds (e.g. styrene, vinyltoluene, α-methylstyrene, etc.), vinyl esters (e.g. vinyl acetate, vinyl propionate, vinyl versatate, etc.), allyl esters (e.g. allyl acetate, etc.), halogen-containing monomers (e.g. vinylidene chloride, vinyl chloride, etc.), vinyl cyanides (e.g. (meth)acrylonitrile, etc.), and olefins (e.g. ethylene, propylene, etc.).

Of these copolymerizable monomers, (meth)acrylic acid alkyl esters, (meth)acrylamides, and aromatic vinyl compounds are preferable, with methyl(meth)acrylate, ethyl (meth)acrylate, propyl(meth)acrylate, isopropyl(meth)acrylate, n-butyl(meth)acrylate, isobutyl(meth)acrylate, t-butyl (meth)acrylate, hexyl(meth)acrylate, octyl(meth)acrylate, 2-ethylhexyl(meth)acrylate, 2-hydroxyethyl(meth)acrylate, and styrene being particularly preferable.

A polymer as above can be synthesized through radical (co)polymerization of the monomer(s). As the radical polymerization, a publicly known method such as bulk polymerization, solution polymerization, or emulsion polymerization can be used. Moreover, a polymerization initiating catalyst well known to persons skilled in the art can be used as required.

The weight average molecular weight of a polymer having an onium group used in the present invention is preferably not less than 1000 but not more than 50000, particularly preferably not less than 2000 but not more than 30000.

The amount used of the polymer having an onium group in the present invention is preferably in a range of 1 to 90% by mass, more preferably 10 to 75% by mass, particularly preferably 20 to 50% by mass, relative to all of each liquid. If the amount used is less than this, then it may not be possible to achieve the effects of the present invention effectively, whereas if the amount used is greater than this, then the viscosity may become high, and hence problems with the ink ejectability may arise.

Polymers having a Nitrogen-Containing Hetero Ring

A polymer having a nitrogen-containing hetero ring may be a homopolymer of only a monomer having a nitrogen-containing hetero ring, or a copolymer of a monomer having a nitrogen-containing hetero ring and another monomer. The "monomer having a nitrogen-containing hetero ring" content in the polymer having a nitrogen-containing hetero ring is preferably at least 10 mol %, more preferably at least 20 mol %.

Here, specific examples of the nitrogen-containing hetero ring include saturated hetero rings (e.g. aziridine, azetidine, pyrrolidone, piperidine, piperazine, morpholine, thiomorpholine, caprolactam, valerolactam), and unsaturated hetero rings (e.g. imidazole, pyridine, pyrrole, pyrazole, pyrazine, pyrimidine, indole, purine, quinoline, triazine, etc.).

These nitrogen-containing hetero rings may further have substituents, examples of the substituents including alkyl groups, aryl groups, alkoxy groups, aryloxy groups, halogen atoms, a hydroxyl group, carbamoyl groups, and amino groups.

A polymer used in the present invention is preferably a polymer obtained from a vinyl monomer having such a nitrogen-containing hetero ring. Specific examples include N-vinylpyrrolidone, N-vinylcaprolactam, acryloylmorpholine, acryloylthiomorpholine, N-vinylimidazole, 2-methyl-1-vinylimidazole, 2-vinylpyridine, 4-vinylpyridine, N-vinylcarbazole, N-methylmaleimide, N-ethylmaleimide, and 2-isopropenyl-2-oxazoline. Of these, N-vinylimidazole, 2-vinylpyridine, and 4-vinylpyridine are particularly preferable.

Furthermore, a polymer used in the present invention may be a copolymer between such a monomer and a monomer that can be copolymerized therewith. Examples of copolymerizable monomers include (meth)acrylic acid alkyl esters (e.g. C1-18 alkyl esters of (meth)acrylic acid such as methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, octyl (meth)acrylate, 2-ethylhexyl (meth)acrylate, lauryl (meth)acrylate, and stearyl (meth)acrylate, etc.), (meth) acrylic acid cycloalkyl esters (e.g. cyclohexyl (meth)acrylate, etc.), (meth)acrylic acid aryl esters (e.g. phenyl (meth)acrylate, etc.), aralkyl esters (e.g. benzyl (meth)acrylate, etc.), substituted (meth)acrylic acid alkyl esters (e.g. 2-hydroxyethyl (meth)acryl ate, etc.), (meth)acrylamides (e.g. (meth) acrylamide, dimethyl (meth)acrylamide, etc.), aromatic vinyl compounds (e.g. styrene, vinyltoluene, α-methylstyrene, etc.), vinyl esters (e.g. vinyl acetate, vinyl propionate, vinyl versatate, etc.), allyl esters (e.g. allyl acetate, etc.), halogen-containing monomers (e.g. vinylidene chloride, vinyl chloride, etc.), vinyl cyanides (e.g. (meth)acrylonitrile, etc.), and olefins (e.g. ethylene, propylene, etc.).

Of these copolymerizable monomers, (meth)acrylic acid alkyl esters, (meth)acrylamides, and aromatic vinyl compounds are preferable, with methyl(meth)acrylate, ethyl (meth)acrylate, propyl(meth)acrylate, isopropyl(meth)acrylate, n-butyl(meth)acrylate, isobutyl(meth)acrylate, t-butyl (meth)acrylate, hexyl(meth)acrylate, octyl(meth)acrylate, 2-ethylhexyl(meth)acrylate, 2-hydroxyethyl(meth)acrylate, and styrene being particularly preferable.

The "monomer having a nitrogen-containing hetero ring" content in the polymer having a nitrogen-containing hetero ring is preferably not less than 10 but not more than 100 mol %, more preferably not less than 20 but not more than 100 mol %.

A polymer as above can be synthesized through radical (co)polymerization of the monomer(s). As the radical polymerization, a publicly known method such as bulk polymerization, solution polymerization, or emulsion polymerization can be used. Moreover, a polymerization initiating catalyst well known to persons skilled in the art can be used as required.

Furthermore, a polymer used in the present invention may be obtained by polycondensation. Examples include polymers obtained through polycondensation between a 2,4-dichlorotriazine (e.g. 2,4-dichloro-6-butylamino-1,3,5-triazine) and a diamine (e.g. N,N'-dimethylethylenediamine, N,N'-dimethylhexamethylenediamine, N,N'-dibutylhexamethylenediamine, N,N'-dioctylhexamethylenediamine, etc.), and polymers obtained through polycondensation between a piperazine and a dicarboxylic acid (e.g. adipic acid) ester.

Preferable specific examples of polymers having a nitrogen-containing hetero ring are as follows.

P3-1

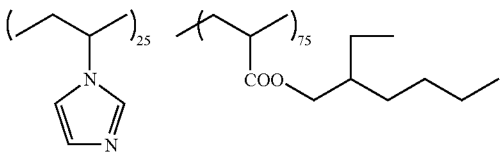

P3-2

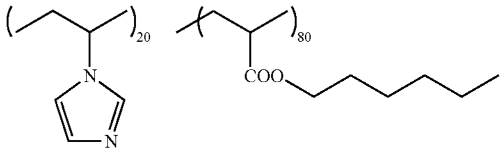

P3-3

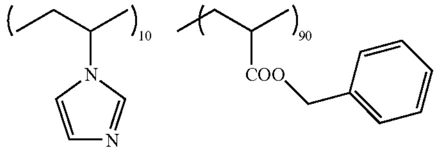

P3-4

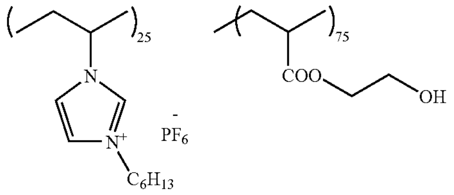

P3-5

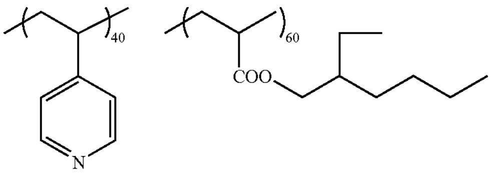

P3-6

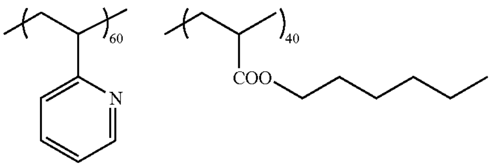

P3-7

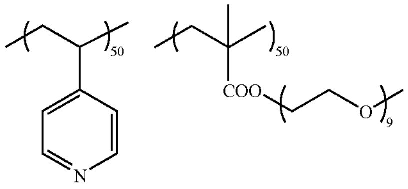

-continued
P3-8
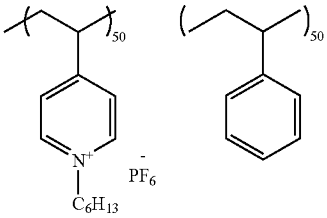
P3-9
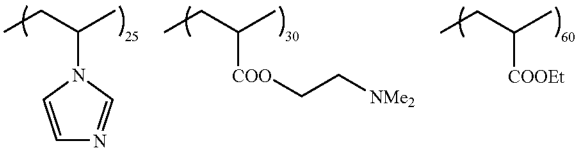
P3-10
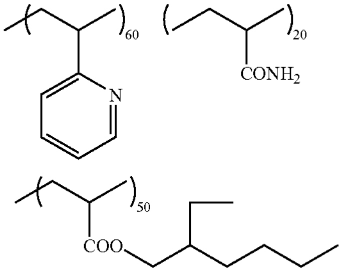
P3-11
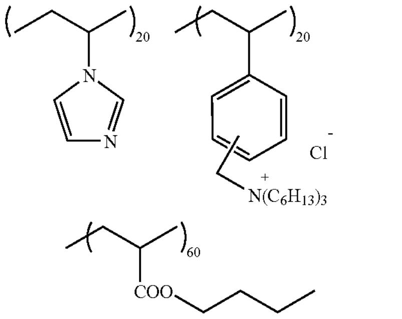
P3-12
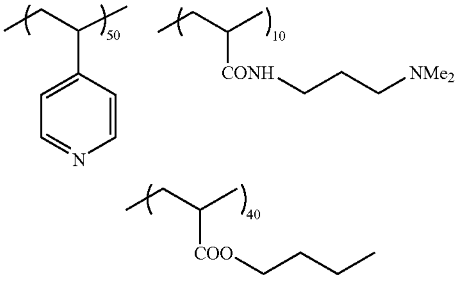
Furthermore, the following polymers are also preferable specific examples.
P3-13
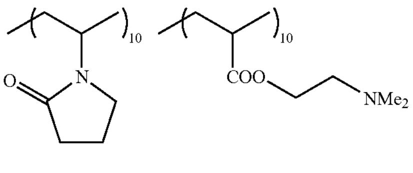
-continued
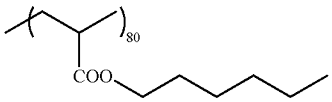
P3-14
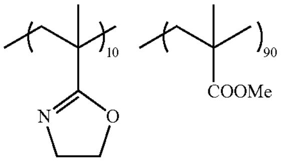
P3-15
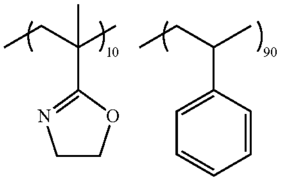
P3-16
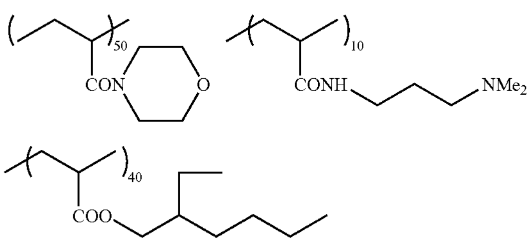
P3-17
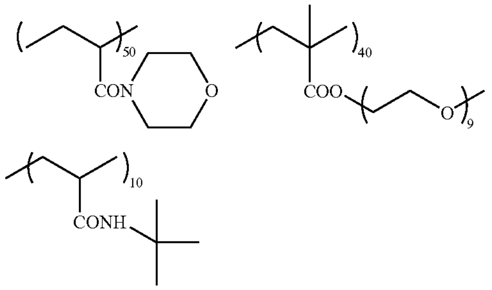
P3-18
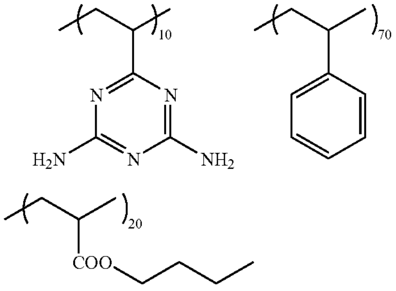
P3-19
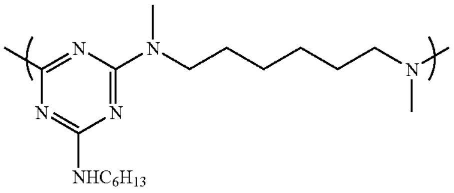

-continued

P3-20

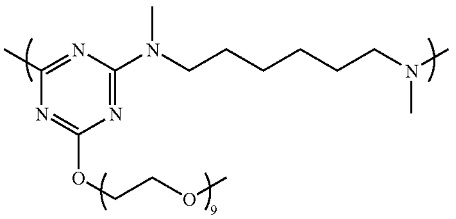

P3-21

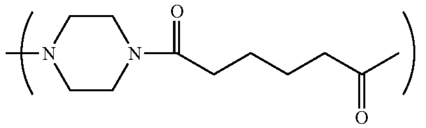

P3-22

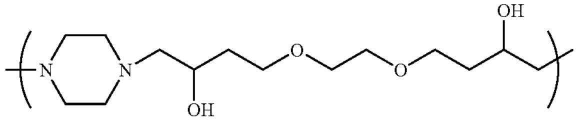

The weight average molecular weight of a polymer having a nitrogen-containing hetero ring used in the present invention is preferably not less than 1000 but not more than 50000, particularly preferably not less than 2000 but not more than 30000.

The amount used of the polymer having a nitrogen-containing hetero ring in the present invention is preferably in a range of 1 to 90% by mass, more preferably 10 to 75% by mass, particularly preferably 20 to 50% by mass, relative to all of each liquid. If the amount used is less than this, then it may not be possible to achieve the effects of the present invention effectively, whereas if the amount used is greater than this, then the viscosity may become high, and hence problems with the ink ejectability may arise.

Metal Compounds

Examples of metal compounds are metal salts of aliphatic carboxylic acids (e.g. acetic acid, propionic acid, butyric acid, valeric acid, isovaleric acid, pivalic acid, lauric acid, myristic acid, palmitic acid, stearic acid, 2-ethylhexanoic acid, lactic acid, pyruvic acid, etc.), metal salts of aromatic carboxylic acids (e.g. benzoic acid, salicylic acid, phthalic acid, cinnamic acid, etc.), metal salts of aliphatic sulfonic acids (e.g. methanesulfonic acid, ethanesulfonic acid, propanesulfonic acid, hexanesulfonic acid, 2-ethylhexanesulfonic acid, etc.), and metal salts of aromatic sulfonic acids (benzenesulfonic acid, naphthalenesulfonic acid, etc.), and also 1,3-diketone metal compounds. Of these, metal salts of aliphatic carboxylic acids, and 1,3-diketone metal compounds are preferable.

An aliphatic carboxylic acid as above may be straight chain, branched, or cyclic, and preferably has 2 to 40 carbon atoms, more preferably 6 to 25 carbon atoms. Moreover, the aliphatic carboxylic acid may have substituents, examples of the substituents including aryl groups, alkoxy groups, aryloxy groups, halogen atoms, a hydroxyl group, carbamoyl groups, amino groups, and a carboxy group.

Preferable examples of aryl groups as substituents include a phenyl group, alkylphenyl groups (e.g. a methylphenyl group, an ethylphenyl group, an n-propylphenyl group, an n-butylphenyl group, a cumenyl group, a mesityl group, a tolyl group, a xylyl group), a naphthyl group, a chlorophenyl group, a dichlorophenyl group, a trichlorophenyl group, a bromophenyl group, a hydroxyphenyl group, a methoxyphenyl group, an acetoxyphenyl group, and a cyanophenyl group, with a phenyl group and a naphthyl group being more preferable.

Preferable examples of alkoxy groups as substituents are a methoxy group, an ethoxy-group, a propoxy group, an isopropoxy group, a butoxy group, a t-butoxy group, a hexyloxy group, a cyclohexyloxy group, a 2-ethylhexyloxy group, an octyloxy group, and a dodecyloxy group, with a methoxy group, an ethoxy group, a propoxy group, an isopropoxy group, a butoxy group, and a t-butoxy group being more preferable.

Preferable examples of aryloxy groups as substituents are a phenoxy group, a methylphenoxy group, an ethylphenoxy group, a cumenyloxy group, a tolyloxy group, a xylyloxy group, a naphthyloxy group, a chlorophenoxy group, a hydroxyphenoxy group, a methoxyphenoxy group, and an acetoxyphenoxy group, with a phenoxy group being more preferable.

Examples of halogen atoms as substituents are a fluorine atom, a chlorine atom, a bromine atom, and an iodine atom.

Preferable examples of carbamoyl groups as substituents are carbamoyl groups, alkylcarbamoyl groups (e.g. a methylcarbamoyl group, an ethylcarbamoyl group, a propylcarbamoyl group, a butylcarbamoyl group, etc.), and arylcarbamoyl groups (e.g. a phenylcarbamoyl group), with a carbamoyl group, a methylcarbamoyl group, and an ethylcarbamoyl group being more preferable.

Preferable examples of amino groups as substituents are a primary amino group, N-substituted amino groups (e.g. an N-methylamino group, an N-ethylamino group, an N-propylamino group, an N-butylamino group, an N-hexylamino group, an N-octylamino group, an N-benzylamino group), and N,N-disubstituted amino groups (e.g. an N,N-dimethylamino group, an N,N-diethylamino group, an N-methyl-N-ethylamino group, an N,N-dibutylamino group, an N-ethyl-N-octylamino group, an N-methyl-N-benzyl amino group), with an N-methylamino group, an N-ethylamino group, an N,N-dimethylamino group, an N,N-diethylamino group, and an N-methyl-N-ethylamino group being more preferable.

Particularly preferable aliphatic carboxylic acids are n-hexanoic acid, 2-ethylhexanoic acid, n-octanoic acid, lauric acid, myristic acid, palmitic acid, stearic acid, and 2-ethylhexanoic acid. Ethylenediaminetetraacetic acid is also a preferable example.

A 1,3-diketone as above may be may be straight chain, branched, or cyclic, and preferably has 5 to 40 carbon atoms, more preferably 5 to 25 carbon atoms. Examples include 2,4-pentadione, 3,5-heptadione, 2,2,6,6-tetramethylheptadione, 4,6-nonadione, 7,9-pentadecadione, 2,4-dimethyl-7,9-pentadecadione, 2-acetylcyclopentanone, 2-acetylcyclohexanone, 3-methyl-2,4-pentadione, 3-(2-ethylhexyl)2,4-pentadione, and 3-[4-(2-ethylhexyloxy)benzyl]-2,4-pentadione, with 2,4-pentadione, 7,9-pentadecadione, and 3-[4-(2-ethylhexyloxy)benzyl]-2,4-pentadione being preferable.

These groups may further have substituents, examples of the substituents including aryl groups, alkoxy groups, aryloxy groups, halogen atoms, a hydroxyl group, carbamoyl groups, amino groups, and a carboxy group. More preferable aryl groups, alkoxy groups, aryloxy groups, halogen atoms, hydroxyl groups, carbamoyl groups, and amino groups as substituents are as in the case of an aliphatic carboxylic acid described above.

An example of the metal in the metal compound is one selected from the group of zinc, aluminum, calcium, magnesium, iron, cobalt, nickel, and copper. Of these, zinc, aluminum, and nickel are preferable, with zinc being particularly preferable.
Preferable metal salts of aliphatic carboxylic acids in the present invention are as follows.
1-1
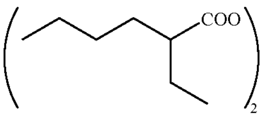
1-2
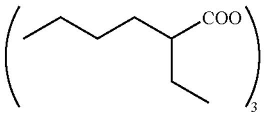
1-3
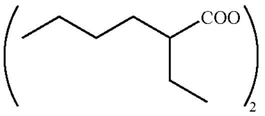
1-4
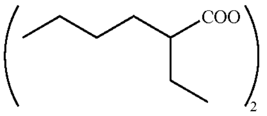
1-5
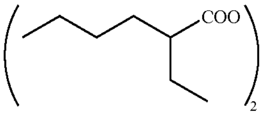
1-6
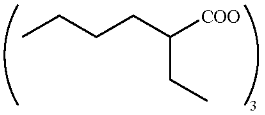
1-7
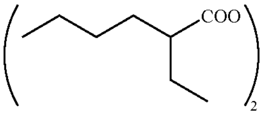
1-8
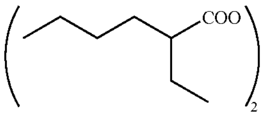
1-9
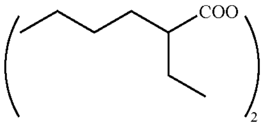
1-10
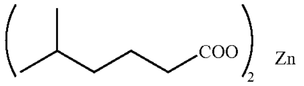
1-11
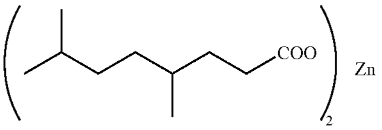
-continued
1-12
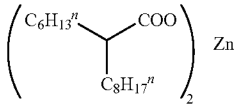
1-13
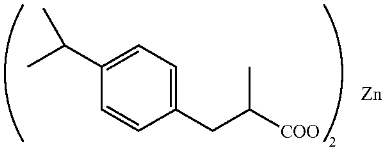
1-14
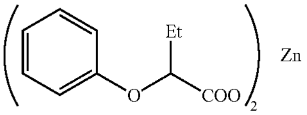
1-15
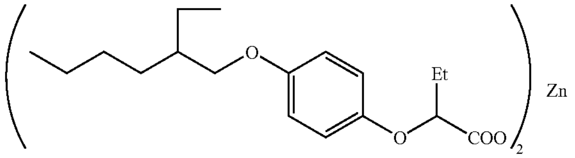
1-16
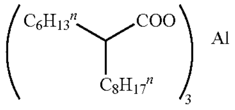
Furthermore, preferable specific examples of 1,3-diketone metal compounds in the present invention are as follows.
2-1
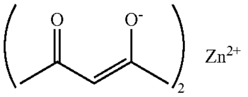
2-2
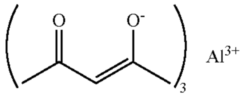
2-3
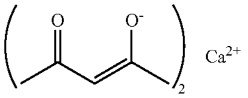
2-4
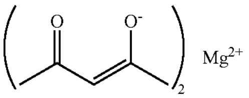
2-5
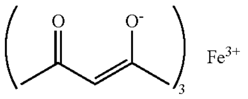
2-6
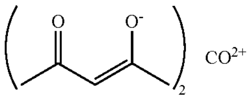

-continued 2-7

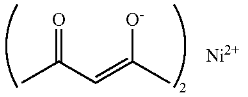

2-8

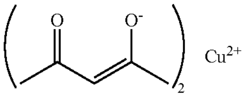

2-9

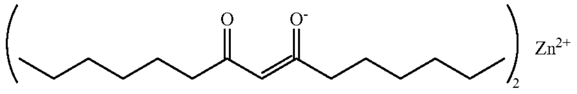

2-10

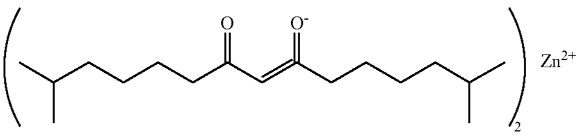

2-11

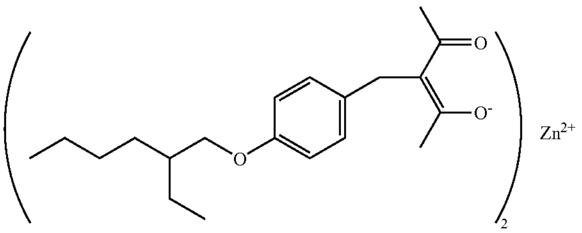

A metal salt of an aliphatic carboxylic acid or a 1,3-diketone metal compound as above can be synthesized through complexation in a solution. Alternatively, there is no limitation to this, but rather another publicly known method may be used.

The amount used of the metal compound in the present invention is preferably in a range of 1 to 90% by mass, more preferably 10 to 75% by mass, particularly preferably 20 to 50% by mass, relative to all of each liquid. If the amount used is less than this, then it may not be possible to achieve the effects of the present invention effectively, whereas if the amount used is greater than this, then the viscosity may become high, and hence problems with the ink ejectability may arise.

High-boiling Organic Solvents (Oils)

In the present invention, "high-boiling organic solvent" refers to an organic solvent that has a viscosity at 25° C. of not more than 100 mPa·s or a viscosity at 60° C. of not more than 30 mPa·s, and has a boiling point higher than 100° C.

Here, "viscosity" in the present invention refers to the viscosity obtained using a RE80 viscometer made by Toki Sangyo Co., Ltd. The RE80 viscometer is a conical rotor/flat plate type viscometer corresponding to the E type, and measurement is carried out using a rotor code No. 1 rotor at a rotational speed of 10 rpm. Note, however, that in the case of a viscosity higher than 60 mPa·s, measurement is carried out with the rotational speed changed to 5 rpm, 2.5 rpm, 1 rpm, 0.5 rpm, or the like as required.

Moreover, "solubility of water" in the present invention means the saturated concentration of water in the high-boiling organic solvent at 25° C., this being the mass (g) of water that can be dissolved in 100 g of the high-boiling organic solvent at 25° C.

The amount used of the high-boiling organic solvent is preferably 5 to 2000% by mass, more preferably 10 to 1000% by mass, in terms of the consumed amount relative to the colorant used.

In the present invention, various compounds are preferable as the high-boiling organic solvent.

Storage Stabilizer

In the present invention, a storage stabilizer may be added to each of the plurality of liquids with an object of suppressing undesirable polymerization during storage of the liquid. The storage stabilizer is preferably used in each of the liquids having the polymerizable compound(s) therein. Moreover, it is preferable to use a storage stabilizer that is soluble in the liquid or other coexisting components.

Examples of the storage stabilizer include quaternary ammonium salts, hydroxyamines, cyclic amides, nitrile compounds, substituted ureas, heterocyclic compounds, organic acids, hydroquinones, hydroquinone monoethers, organic phosphines, and copper compounds.

The amount added of the storage stabilizer is preferably adjusted as appropriate on the basis of the activity of the polymerization initiator used, the polymerizability of the polymerizable compound(s), and the type of the storage stabilizer. From the viewpoint of balance between the storage stability and the curability of the ink upon mixing the liquids, the amount added of the storage stabilizer is preferably 0.005 to 1% by mass, more preferably 0.01 to 0.5% by mass, yet more preferably 0.01 to 0.2% by mass, in terms of solid content in the liquid.

Liquid Applying Device

In the inkjet image recording method according to embodiments of the present invention, as the device for applying the first liquid onto the recording medium, a device where the first liquid is jetted from inkjet nozzles may be used, or another device where application (coating) is used for applying the first liquid onto the recording medium may be used.

There are no particular limitations on the device adopting the above application (coating), and it is possible to select a publicly known coating device as appropriate in accordance with the object. Examples of the coating device include an air doctor coater, a blade coater, a rod coater, a knife coater, a squeeze coater, a dip coater, a reverse roll coater, a transfer roll coater, a gravure coater, a kiss roll coater, a cast coater, a spray coater, a curtain coater, and an extrusion coater.

Energy Applying Process

For an exposing light source for promoting polymerization of the polymerizable compound(s) in the present invention, ultraviolet radiation or visible light may be used. Moreover, the application of energy may be carried out using radiation other than light, such as α-rays, γ-rays, X-rays, or an electron beam; however, from the viewpoints of cost and safety, it is preferable to use ultraviolet radiation or visible light, with it being more preferable to use ultraviolet radiation. The amount of energy required for the curing reaction varies depending on the type and content of the polymerization initiator, and is generally approximately 1 to 500 $mJ/cm^2$.

As described above, according to the present embodiment, the ink droplets are deposited onto the recording medium after the treatment liquid has been applied onto the recording medium. Hence the dots formed on the recording medium do not attain equilibrium, which is different from the related arts; and the dot diameter continues to increase until irradiation with UV is carried out. Thus, the dot diameter can be controlled to a desired value over a wider range. Moreover, by changing the time T from an ink droplet being deposited to the ink droplet being irradiated with UV in accordance with the recording density or the deposition amount, an optimum image can be obtained.

The image forming apparatus according to embodiments of the present invention has been described in detail above. However, the present invention is not limited to the above embodiments, and any of various modifications may of course be made so long as this is within a scope such as not to deviate from the gist of the present invention.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming apparatus comprising:

an applying device that applies a first liquid containing a diffusion preventing agent for a coloring material, onto a recording medium;

a droplet depositing device that deposits a second liquid containing the coloring material, onto the recording medium onto which the first liquid has been applied;

a radiation irradiating device that radiates radiation onto the recording medium onto which the second liquid has been deposited; and a controlling device that controls a dot diameter of the second liquid by adjusting a time from the second liquid being deposited to the second liquid being irradiated with the radiation, according to deposition data for the droplet depositing device, wherein the first liquid prevents the coloring material of the second liquid from permeating through the recording medium in a direction of thickness of the recording medium while the coloring material of the second liquid continues to spread out on the recording medium in a direction parallel to a surface of the recording medium until the coloring material of the second liquid is cured.

2. The image forming apparatus as defined in claim 1, wherein the controlling device controls the time in such a manner that the relatively lower a recording density by the droplet depositing device becomes, the longer the time is.

3. The image forming apparatus as defined in claim 1, wherein the controlling device controls the time in such a manner that the relatively higher a deposition amount by the droplet depositing device becomes, the longer the time is.

4. The image forming apparatus as defined in claim 1, wherein the diffusion preventing agent contains at least one selected from the group including polymers having an amino group, polymers having an onium group, polymers having a nitrogen-containing hetero ring, and metal compounds.

5. The image forming apparatus as defined in claim 1, wherein the first liquid contains a high-boiling organic solvent and a radiation curing initiator; and the second liquid contains a radiation-curable polymerizable compound.

6. The image forming apparatus as defined in claim 5, wherein the high-boiling organic solvent satisfies the following conditions (i) and (ii):

(i) viscosity of the high-boiling organic solvent is not more than 100 mPa·s at 25° C., or the viscosity of the high-boiling organic solvent is not more than 30 mPa·s at 60° C.; and (ii) a boiling point of the high-boiling organic solvent is higher than 100° C.

7. The image forming apparatus as defined in claim 1, wherein the first liquid further contains a radiation-curable polymerizable compound and a radiation curing initiator; and the second liquid further contains a radiation-curable polymerizable compound.

8. The image forming apparatus as defined in claim 1, wherein said deposition data includes a recording density for the droplet depositing device.

9. The image forming apparatus as defined in claim 1, wherein said deposition data includes an ejection volume for the droplet depositing device.

* * * * *